Aug. 18, 1953  W. J. HAINES ET AL  2,649,401
STEROID OXIDATION
Filed Sept. 16, 1950  18 Sheets-Sheet 1

Paperchrogram PM 58
Example I.
Toluene-Propylene Glycol  16 hours
A. 54γ Streptomyces fradiae, strain 3535 fermentation of 11-desoxy-17-hydroxycorticosterone (δ).
B. 20γ Each of 17-hydroxycorticosterone (F), 11-dehydro-17 hydroxycorticosterone (E), 11 desoxy-17 hydroxycorticosterone (S).

Paperchrogram PM 58
Example I.
Methyl cyclohexane-Carbitol  18 hours
A. 77γ Band II - Column Chromatogram PM 58.
B. 85γ Band I - Column Chromatogram PM 58.
C. 20γ 11-Desoxycorticosterone (Q).

fig. 1

fig. 3

INVENTORS
WILLIAM J. HAINES
DONALD R. COLINGSWORTH
BY
ATTORNEY

Paperchrogram PM 58
Example I.
Toluene-Propylene Glycol   17 hours
A. 20γ each 17-hydroxycorticosterone (F), 11-dehydro-17-hydroxycorticosterone (E), 11-desoxy-17 hydroxy-corticosterone (S).
B. 72γ Band V - Column Chromatogram PM 58.
C. 60γ Band IV - Column Chromatogram PM 58.
D. 83γ Band III - Column Chromatogram PM 58.

Paperchrogram PM 58
Example I.
Toluene-Propylene Glycol   18 hours
A. 85γ Band VIII - Column Chromatogram PM 58.
B. 55γ Band VII - Column Chromatogram PM 58.
C. 72γ Band VI - Column Chromatogram PM 58.
D. 20γ each 17-hydroxycorticosterone (F), 11-dehydro-17-hydroxycorticosterone (E), 11-desoxy-17-hydroxycorticosterone (S).

fig. 4

fig. 5

INVENTORS
WILLIAM J. HAINES
DONALD R. COLINGSWORTH
BY
ATTORNEY

Paperchromatogram PM 58
Example I
Toluene-Propylene Glycol   120 hours
A. { 40γ MPF-I (189-C-EDN-I).
    { 20γ 17-hydroxycorticosterone (F).
B. 40γ MPF-I (189-C-EDN-I).
C. 20γ 17-hydroxycorticosterone (F).

Paperchromatogram PM 58
Example I
Toluene-Propylene Glycol   18 hours
A. 20γ 17-hydroxycorticosterone, 10γ 278-A-MPB-3.
B. 10γ 278-A-MPB-3.
C. 10γ 278-A-MPB-3
D. 20γ 17-hydroxycorticosterone (F).

INVENTORS
WILLIAM J. HAINES
DONALD R. COLINGSWORTH
BY
ATTORNEY

Paperchromatogram PM 34
Example 2
Toluene-Ethylene Glycol  6 hours
A. 30γ Band V Column Chromatogram PM 34.
B. 30γ Band IV Column Chromatogram PM 34.
C. 25γ Band III Column Chromatogram PM 34.
D. 45γ Band II Column Chromatogram PM 34.
E. 20γ Corticosterone (B).
F. 20γ each 17-hydroxycorticosterone (F), 11-dehydro-17-hydroxycorticosterone (E), 11-desoxy-17-hydroxycorticosterone (S).

Paperchromatogram PM 34
Example 2
Toluene-Ethylene Glycol  7¼ hours
A. 165γ Streptomyces fradiae, Strain 3535 Fermentation of 11-desoxy-17-hydroxycorticosterone (S).
B. 20γ each 17-hydroxycorticosterone (F), corticosterone.

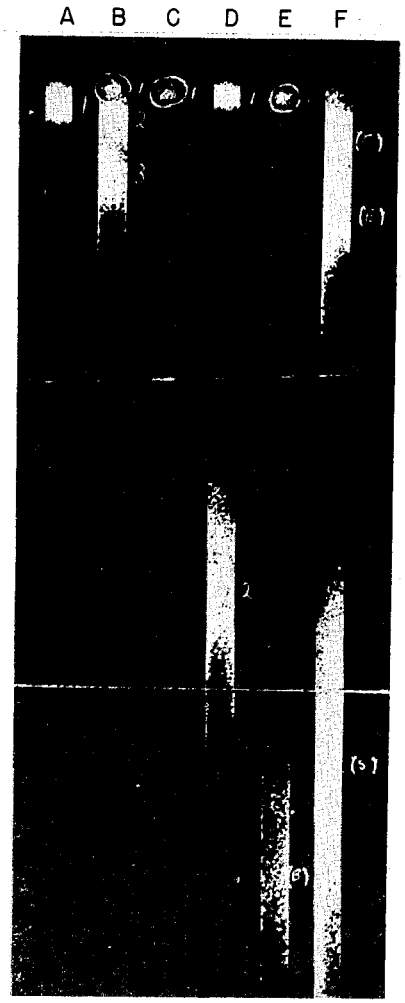

fig. 12

fig. 10

INVENTORS
WILLIAM J. HAINES
DONALD R. COLINGSWORTH
BY
ATTORNEY

Aug. 18, 1953    W. J. HAINES ET AL    2,649,401
STEROID OXIDATION
Filed Sept. 16, 1950    18 Sheets-Sheet 8

Paperchromatogram PM 55
Example 3
Toluene-Propylene Glycol    16 hours
A. 45γ Streptomyces    (H-39)
   Fermentation of 11-desoxy-17-hydroxy-
   corticosterone (S) pH adjusted to 1
   prior to extraction.
B. 34γ Streptomyces    (H-39)
   Fermentation of 11-desoxy-17-hydroxy-
   corticosterone (S).
C. 20γ each 17-hydroxycorticosterone
   (F), 11-dehydro-17-hydroxycorticoster-
   one (E), 11-desoxy-17-hydroxycorti-
   costerone (S).

Paperchromatogram PM 34
Example 2
Toluene-Ethylene Glycol    17 hours
A. 23γ Band VI Column Chromatogram
   PM-34
B. 20γ each 17-hydroxycorticosterone (F),
   11-dehydro-17-hydroxycorticosterone (E)

fig. 13

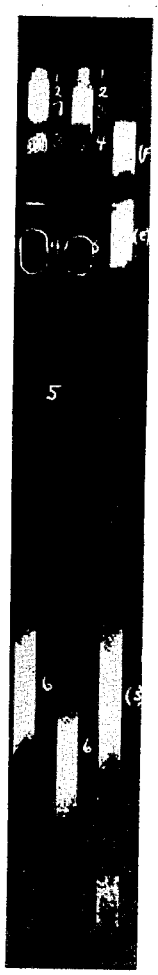

fig. 14

INVENTORS
WILLIAM J. HAINES
DONALD R. COLINGSWORTH
BY
ATTORNEY

Paperchromatogram PM 54
Example 4
Toluene-Propylene Glycol   3 hours
A. 69γ Between Bands II and III Column Chromatogram PM 54.
B. 47γ Band II Column Chromatogram PM 54.
C. 94γ Band I Column Chromatogram PM 54.
D. 20γ each 11-dehydro-17-hydroxycorticosterone (E), 11-desoxycorticosterone (Q).

Paperchromatogram PM 54
Example 4
Toluene-Propylene Glycol   18 hours
A. 20γ each 17-hydroxycorticosterone (F), 11-desoxy-17-hydroxycorticosterone (S).
B. Not pertinent to this example.
C. 40γ Streptomyces fradiae, Strain 3535 fermentation of 11-desoxy-17-hydroxycorticosterone (S).

fig. 17

fig. 16

INVENTORS
WILLIAM J. HAINES
DONALD R. COLINGSWORTH
BY
ATTORNEY

Aug. 18, 1953 — W. J. HAINES ET AL — 2,649,401
STEROID OXIDATION
Filed Sept. 16, 1950 — 18 Sheets-Sheet 11

Paperchromatogram PM 54
Example 4
Toluene-Propylene Glycol    8 hours
A. 100γ Band V Column Chromatogram PM 54.
B. 100γ Band IV Column Chromatogram PM 54.
C. 100γ Band III Column Chromatogram PM 54.
D. $\begin{cases} 20γ\ 17\text{-hydroxycorticosterone (F).} \\ 50γ\ 11\text{-desoxy-17-hydroxycorticosterone (S).} \end{cases}$ Paperchromatogram PM 54
Example 4
Toluene-Propylene Glycol    24 hours
A. 100γ Band VI Column Chromatogram PM 54.
B. 100γ Between Bands V and VI Column Chromatogram PM 54.
C. 100γ Band V Column Chromatogram PM 54.
D. $\begin{cases} 20γ\ \text{each, 17-hydroxycorticosterone (F),} \\ 11\text{-dehydro-17-hydroxycorticosterone (E).} \\ 50γ\ 11\text{-desoxy-17-hydroxycorticosterone (S).} \end{cases}$

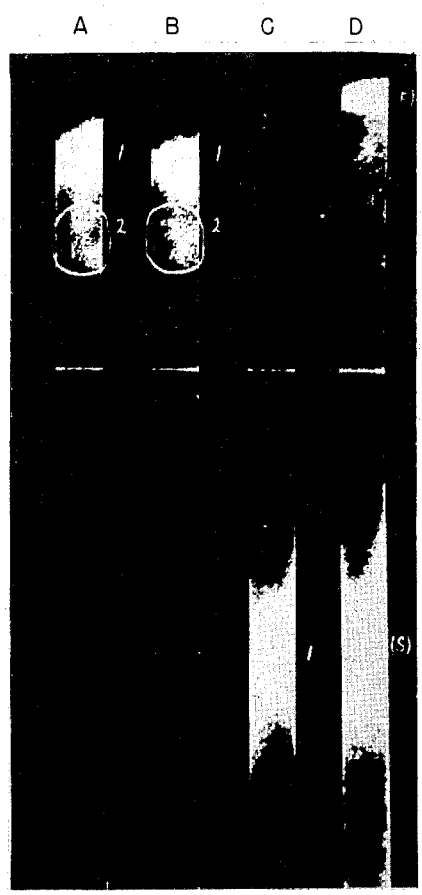

fig. 18

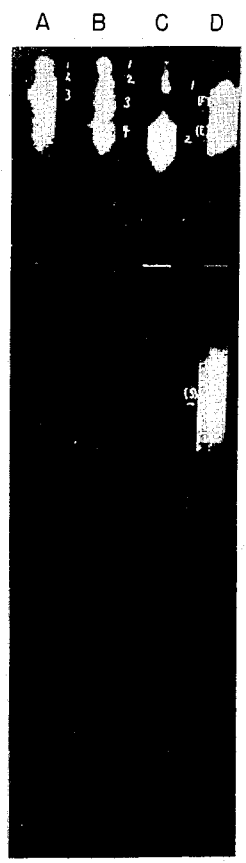

fig. 19

INVENTORS
WILLIAM J. HAINES
DONALD R. COLINGSWORTH
BY
ATTORNEY

Aug. 18, 1953    W. J. HAINES ET AL    2,649,401
STEROID OXIDATION
Filed Sept. 16, 1950    18 Sheets-Sheet 12

Paperchromatogram PM 61
Example 5
Toluene-Propylene Glycol    17 hours
A. 20γ each, 17-hydroxycorticosterone (F), 11-dehydro-17-hydroxycorticosterone (E), 11-desoxy-17-hydroxycorticosterone (S).
B. Not pertinent to this example.
C. 57γ Streptomyces fradiae, strain 3535 fermentation of 11-desoxy-17-hydroxycorticosterone (S).
D. Same as C above.
E. Not pertinent to this example.
F. 20γ each 17-hydroxycorticosterone (F), 11-dehydro-17-hydroxycorticosterone (E), corticosterone (B).

A B C D E F

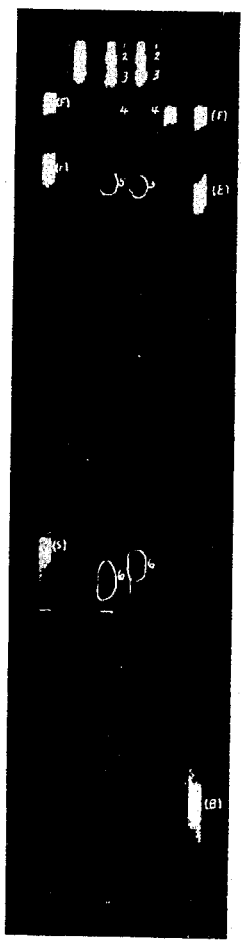

fig. 21

Paperchromatogram PM 54
Example 4
Toluene-Propylene Glycol    24 hours
A. 100γ Band VIII Column Chromatogram PM 54.
B. 100γ Band VII Column Chromatogram PM 54.
C. 100γ Band VI Column Chromatogram PM 54.
D. {20γ 17-hydroxycorticosterone (F), 11-dehydro-17-hydroxycorticosterone (E). 50γ 11-desoxy-17-hydroxycorticosterone (S).

A B C D

fig. 20

INVENTORS
WILLIAM J. HAINES
DONALD R. COLINGSWORTH
BY
ATTORNEY

Aug. 18, 1953  W. J. HAINES ET AL  2,649,401
STEROID OXIDATION

Filed Sept. 16, 1950  18 Sheets-Sheet 13

Paperchromatogram PM 32
Example 7
Toluene-Propylene Glycol  6 hours
A. 72γ Streptomyces fradiae, strain 3535 Fermentation of 11-desoxycorticosterone (Q).
B. 20γ each corticosterone (B), 11-desoxycorticosterone (Q).

Paperchromatogram PM 32
Example 7
Toluene-Ethylene Glycol  7¼ hours
A. 36γ Band II Column Chromatogram PM 32.
B. Not pertinent to this example.
C. 20γ each 17-hydroxycorticosterone (F), 11-desoxy-17-hydroxycorticosterone (S).

fig. 22

fig. 24

INVENTORS
WILLIAM J. HAINES
DONALD R. COLINGSWORTH
BY
ATTORNEY

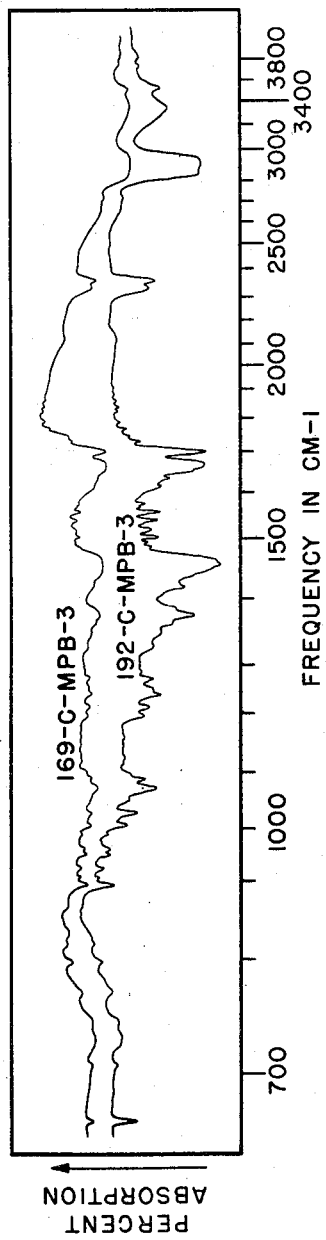

Aug. 18, 1953    W. J. HAINES ET AL    2,649,401
STEROID OXIDATION

Filed Sept. 16, 1950    18 Sheets-Sheet 16

Paperchromatogram PM 32
Example 7
Toluene-Propylene Glycol    12 hours
A. { 50γ MPS-1(192-C-MPB-3).
     40γ corticosterone (B).
B. 50γ MPS-1(192-C-MPB-3).
C. 50γ 11-desoxy-17-hydroxycorticoster-
    one (S).
D. { 40γ corticosterone (B).
     20γ 11-dehydro-17-hydroxycorticoster-
     one (E).

A    B    C    D

fig. 26

Paperchromatogram PM 32
Example 7
Toluene-Ethylene Glycol    16 hours
A. 20γ each Band V Column Chromato-
    gram PM 32, 17-hydroxycorticosterone
    (F).
B. 20γ Band V Column Chromatogram
    PM 32.
C. { 32γ Band IV Column Chromatogram
     PM 32.
     20γ 17-hydroxycorticosterone (F).
D. 32γ Band IV Column Chromatogram
    PM 32.
E. 20γ each 17-hydroxycorticosterone (F),
    11-dehydro-17-hydroxycorticosterone (E).

A    B    C    D    E

fig. 27

INVENTORS
WILLIAM J. HAINES
DONALD R. COLINGSWORTH
BY
ATTORNEY

Aug. 18, 1953

W. J. HAINES ET AL 2,649,401

STEROID OXIDATION

Filed Sept. 16, 1950

Paperchromatogram PM 31
Example 16

Toluene-Propylene Glycol   6 hours
A. 99γ Streptomyces   (BC-17)
    Fermentation of 11-desoxycorticosterone (Q).
B. Not pertinent to this example.
C.   "     "     "   "    "
D.   "     "     "   "    "
E.   "     "     "   "    "
F. 20γ each, corticosterone (B), 11-desoxycorticosterone (Q).

A B C D E F

fig. 29

Paperchromatogram PM 35
Example 15

Toluene-Propylene Glycol.   16 hours
A. 75γ Penicillium chrysogenum, Wisconsin strain 48-701 fermentation of 11-desoxycorticosterone (Q).
B. Not pertinent to this example.
C. 20γ each 17-hydroxycorticosterone (F), 11-dehydro-17-hydroxycorticosterone (E), 11-desoxy-17-hydroxycorticosterone (S).

A B C

fig. 28

INVENTORS
WILLIAM J. HAINES
DONALD R. COLINGSWORTH
BY
ATTORNEY

Paperchromatogram PM 38
Example 17
Toluene-Propylene Glycol    4 hours
A. 20γ Aspergillus fumigatus.
   Fermentation of 11-deoxycorticosterone (Q).
B. 20γ each corticosterone (B), 11-desoxycorticosterone (B).

A B

fig. 30

Paperchromatogram PM 38
Example 17
Toluene-Propylene Glycol    18 hours
A. 20γ Aspergillus fumigatus.
   Fermentation of 11-desoxycorticosterone (Q).
B. Not pertinent to this example.
C. 20γ each 17-hydroxycorticosterone (F),
   11-dehydro-17-hydroxycorticosterone (E),
   corticosterone (B).

A B C

fig. 31

INVENTORS
WILLIAM J. HAINES
DONALD R. COLINGSWORTH
BY
ATTORNEY

Patented Aug. 18, 1953

2,649,401

UNITED STATES PATENT OFFICE 2,649,401

STEROID OXIDATION

William J. Haines and Donald R. Colingsworth, Kalamazoo, Mich., assignors to The Upjohn Company, Kalamazoo, Mich., a corporation of Michigan Application September 16, 1950, Serial No. 185,246

20 Claims. (Cl. 195—51)

The present invention relates to a novel method for the introduction of oxygen into a steroid molecule, and to certain novel products produced by the method of the invention.

It is already known to introduce oxygen into the eleven position of a steroid molecule, but such result has been accomplished only through highly technical organic syntheses involving a considerable number of steps. Consequently, the overall yield of eleven oxygenated steroid has been much less than desired, and the cost of such production extremely high, if not prohibitive. This has been an insuperable handicap in the attempt of pharmaceutical chemists to make certain eleven oxygenated steroids available to members of the general public suffering from various maladies, which are presently known to be beneficially affected only by certain eleven oxygenated steroids, since the high production cost and inadequate supply of these important drugs has prevented their dissemination and availability on a large or general scale. Among these drugs, which have an eleven oxygenated steroid structure, may, for example, be mentioned corticosterone, 11-dehydrocorticosterone, 11-dehydro-17-hydroxycorticosterone (compound E, cortisone), and 17-hydroxycorticosterone (compound F). It is, therefore, of considerable importance to find a more satisfactory method of producing oxygenated steroid compounds, especially eleven oxygenated steroid compounds, containing in the eleven position either the keto (oxo) group (=O), as the eleven oxygen appears in various of the desirable drugs, or the hydroxy (oxy) group (—OH), which is itself present in many valuable steroid compounds and which in addition is readily convertible to the keto group by known oxidation procedures. To this end, untold sums of money and hours of effort have been expended, without any marked measure of success up to the present time.

It is an object of the present invention to provide a novel method for the introduction of oxygen into a steroid molecule, especially into the eleven position of a steroid molecule. Another object is the provision of such method whereby an eleven desoxy steroid (the term "eleven desoxy steroid" is employed throughout to indicate a steroid which contains no oxygen in the eleven position) is converted in high yields to an eleven oxygenated steroid by the action of a bacterium of the genus Streptomyces or oxidizing bacterial enzymes obtainable therefrom. An additional object of the invention is the provision of a process for the production of eleven oxygenated steroids from eleven desoxy steroids wherein the conversion is effected by the action of a bacterium of the genus Streptomyces or oxidizing enzymes thereof. Another object of the invention is the provision of a process for the introduction of a beta-hydroxy group into the eleven position of an eleven desoxy steroid through the action of a bacterium of the genus Streptomyces. Still another object of the invention is the provision of novel products, produced by the method of the present invention, and of unique utility as and in the preparation of valuable eleven oxygenated steroid drugs. Other and more particular objects of the invention will become apparent hereinafter.

It has now been found that eleven desoxy steroids, which contain the cyclopentanopolyhydrophenanthrene nucleus, especially the 10,13-dimethylcyclopentanopolyhydrophenanthrenes, can be readily converted in high yields to corresponding oxygenated steroids by subjecting the steroid compound to the action of a bacterium of the genus Streptomyces, or the oxidizing bacterial enzymes produced thereby. By the method of the present invention invention, an efficient, economical, and commercially satisfactory method of introducing oxygen into the eleven position of an eleven desoxy steroid molecule is provided. Accordingly, a novel and simple approach to the production of eleven oxygenated steroid drugs is afforded, which is, as previously stated, of great importance to the chemical, pharmaceutical, and medical profession, and especially to members of the general public suffering from physiological abnormalities known to be beneficially affected only by such eleven oxygenated steroid drugs.

The method of the present invention, in its broader aspects, consists in subjecting an eleven desoxy steroid to the action of an oxidizing bacterium of the genus Streptomyces, or oxidizing enzymes of the bacterium, which are capable of introducing an oxygen atom into the steroid nucleus at the eleven position. Another way of expressing the result of the process of the present invention is to say that the steroid is "oxygenated," since an oxygen atom is introduced thereto. Still otherwise expressed, the eleven position of the steroid may be said to be oxidized. Other positions of the steroid molecule may, in isolated cases, also undergo transformation due to the action of the bacterium, or enzymes thereof, but such transformations are not to be regarded as undesirable, since the introduction of oxygen into other portions of the steroid molecule may result in valuable therapeutic products or intermediates, for example, those containing a hydroxy group at the 17 or 21 positions. In case such additional groups are not considered desirable, methods are available for the removal of such groups with facility. The important consideration of the present invention, as far as the result is concerned, is that the eleven desoxy steroid molecule is oxygenated at least in the eleven position, where previously the steroid molecule was unoxygenated in the eleven position. Hydroxy groups, which are themselves capable of oxidation to keto groups, when present in the molecule of a steroid to be oxygenated in the eleven position, may, if considered necessary, as where exceedingly high yields of eleven oxygenated hydroxysteroid product are sought to be produced, be protected from attack of various types, including attack by the oxidizing bacteria or oxidizing bacterial enzymes, by conversion, as for example by esterification, etherification, halogenation, or the like, to a group which is reconvertible to a hydroxy group. However, such procedure is not a prerequisite to the introduction of oxygen, especially eleven oxygen, into a hydroxysteroid by the method of the present invention.

The steroids operative in the method of the present invention are not limited as to type or number of substituents, and for operativeness in the process need only contain as unoxygenated eleven position, or, otherwise stated, be an eleven desoxy steroid. Such compounds contain the nucleus:

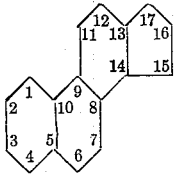

which may in addition contain substituents or combinations of substituents about the nucleus, as in the 1, 2, 3, 4, 5, 6, 7, 8, 9, 10, 11, 12, 13, 14, 15, 16, and 17 positions, especially 10,13-dimethyl groups, 3, 7, or 12 keto, hydroxy, or acyloxy groups; 17-side chains of which the progesterone and corticosterone (Ketol) side chains deserve special mention; a 17 keto group; a 17 hydroxy group, and the like; as well as double bonds in the 4, 5, 6, 7, 8, 9(11), 11(12), 16(17) and other positions, or combination of positions, about the nucleus; or double bonds saturated by addition thereto of halogen or hydrogen halide; adducts of dienophiles such as maleic acid, maleic anhydride, or maleic acid esters with steroids having a conjugated double bond system, as at 5,7; and other substituents and combinations of substituents, double bonds and so forth too numerous for special mention, a great many of which are known in the steroid art.

Representative steroids which may be oxygenated by the method of the invention include, for example, progesterone, 9,11 or 11,12-dehydroprogesterone, 7,9(11)-bisdehydroprogesterone, 17-hydroxyprogesterone, pregnenolone, acyloxypregnenolones such as pregnenolone acetate, 11-desoxycorticosterone, delta 9,11 or 11,12-desoxycorticosterone, 11-desoxy-17-hydroxycorticosterone and acyloxy derivatives, such as the acetoxy derivative, thereof, 21-hydroxypregnenolone and 21-acyl, e. g., acetyl, esters thereof, 17,21-dihydroxypregnenolone and 17,21-diacyloxy derivatives thereof, e. g., the diacetoxy derivative, androstendione, androstan-17-ol, 9,11 or 11,12-dehydroandrostendione, 3-hydroxy-delta 9,11 or 11,12-pregnen-20-ones, 3,21-dihydroxy-delta 9,11 or 11,12-pregnen-20-ones, 3,17,21-trihydroxy-delta 9,11 or 11,12-pregnen-20-ones, 5-androsten-3-ol-17-one and 3-acyl, e. g., acetyl, esters thereof, 5-androsten-3-ol-17-one and 3-acyl, e. g., acetyl, esters thereof; ergosterol, stigmasterol, stigmastanol, and 3-acyl, e. g., acetyl, esters of the foregoing; ergostenone, stigmastenone, stigmastane, cholestenone, cholic acid, desoxycholic acid, lithocholic acid, cholanic acid, norcholanic acid, bisnorcholanic acid, cholenic acid, norcholenic acid, bisnorcholenic acid, and 3-hydroxy-, 3-keto, 3,7-dihydroxy-3,7-diketo-, 3,7,12-trihydroxy-, 3,7,12-triketo, 9,11 or 11,12-unsaturated, ester, thiolester, and further derivatives of the foregoing acids, and the like.

The microorganic biochemical oxygenation is carried out with the employment of an oxidizing bacterium, which is a species of the Streptomyces genus, or oxidizing enzymes obtainable therefrom. Species of this genus which are operative in the method of the invention include, for example, the species *fradiae, endus*, H–39, K–93, BC–17, W–4, *albus, coelicolor, verne, californicus, flaveolus, bobiliae, roseochromogenus, griseolus, erythreus, cellulosae, parvus, malenconi, diastaticus, fimicarius, flavovirens, olivochromogenus, diastatochromogenes, flavochromogenes, antibioticus, viridochromogenes, purpeochromogenus, phaeochromogenus, aureus, erythrochromogenes, lavendulae, reticuli, rubrireticuli, flavus, ruber, citreus, fulvissimus, aureofaciens, rimosus, gougeroti, violaceoniger, griseus, griseoflavus, albidoflavus, poolensis, olivaceus, lieskei, microflavus, cacaoi, novaecaesareae, exfoliatus, gelaticus, rutgersensis, lipmaii, halstedii, hygroscopicus, alboflavus, albosporeus, flocculus, melanosporeus, melanocyclus, acidophilus, rubescens, thermophilus, thermofuscus, scabies, ipomea, fordii, africanus, gallicus, pelletieri, listeri, upcottii, hortonensis, gibsonii, beddardii, kimberi, somaliensis, panjae, willmorei*. While species of the Streptomyces genus are broadly operative in the method of the present invention as the oxidizing microorganism, for reasons of economy and productivity the species *fradiae* and H–39 are preferably utilized for production of optimum yields of desired eleven oxygenated steroid, although in certain cases and under particular circumstances other species may be most advantageously employed. Species of the Streptomcyes genus are possessive of an abundance of the enzyme mechanism, whereby they are able, according to the method of the invention, when suitably grown and contacted with an eleven desoxysteroid, to accomplish oxygenation of the eleven position of the steroid on an industrially important scale.

The microorganisms can be obtained from known sources, such as the Northern Regional Research Laboratories, Peoria, Illinois, or American Type Culture Collection, Washington, D. C. Alternatively, natural sources known to microbiologists may be exploited.

The usual techniques of the microbiologist are followed in isolation of the microorganisms from natural sources. Sterile media are prepared from various carbohydrate and nitrogenous sources, solidified to a gel by the addition of two percent agar. The nitrogen source may vary widely, and may for example include inorganic nitrates, ammonium salts, or protein digests. The media may be sterilized by steam pressure or autoclaving in cotton-stoppered flasks or tubes, and used aseptically to fill Petri dishes, which may be exposed to dust, outside air, soil, soil dilutions, and the like. From these plates develop bacterial growths, among which colonies of Streptomyces can be recognized by a trained microbiologist, and the organism then picked and transferred either to the same medium in test tubes or to any other medium suitable for the growth of the microorganism. The culture of the organism is, for the purpose and practice of the present invention, transferred from either its natural or commercial source on to certain bacteriological media which are favorable to the development of microorganisms. Such media contain at least a carbohydrate source, and a nitrogen source, in most instances a neutralizing agent such as calcium carbonate, and a source of other growth factors such as distiller's solubles, corn steep liquor, and brewer's yeast, or inorganic salts, and the like. The pH reaction of the medium, at the time of inoculation, is ordinarily adjusted to between about 6.5 and 7.5. Autoclaving, as at fifteen pounds pressure for thirty minutes, to obtain aseptic conditions, effects a lowering of the pH of only a few fractions of a pH unit, but this reduction in pH should be taken into consideration in adjusting the medium prior to autoclaving so as to obtain optimum growth conditions upon completion of this step. After 24-48 hours of bacterial growth on the fermentation medium, the pH of the medium is found to have risen considerably, usually to about seven to eight. However, other pH ranges, such as a pH of from about five to about seven, may be used if desired. It is at about this stage in the bacterial growth that the steroid to be oxidized is preferably added, or the bacterial fermentation liquor to be used in fermentive oxidation of steroids is separated from the culture.

Inoculation of the bacterial growth-supporting medium with the selected microorganism of the Streptomyces genus may be accomplished in any suitable manner known in the microbiological art. For example, the inoculation is most conveniently accomplished with vegetative mycelia of the organism, but spore inoculation is equally effective. Growth of the microorganism is readily promoted by maintaining incubation temperatures of about room temperature, e. g., twenty to thirty degrees centigrade, but a relatively wide range of temperatures is suitable, e. g., from about fifteen to about forty degrees centigrade has been found satisfactory for growth of the microorganisms.

The period of bacterial growth required before the steroid desired to be oxygenated may be exposed to the bacterial action, or to the action of the bacterial enzymes, does not appear to be critical. For example, the steroid desired to be oxygenated in the eleven position can be added either at the time of inoculating the medium with the selected Streptomyces species, or at some later time, e. g., twenty-four to seventy-two hours later. In practice, it has been found that the steroid to be oxygenated can be added to the bacterial culture medium as late as four days after inoculation of the medium with the selected Streptomyces species, with no effect on the result being observable. Addition of an eleven desoxysteroid to the fermentation beer after a period of bacterial growth of about 40 to 48 hours is the preferred manner of operation, since at this stage of bacterial growth the oxidizing enzyme mechanism appears to be fully developed. Likewise, if the oxygenation is desired to be effected using the fermentation liquor, containing the oxygenating enzyme, alone, it is at least after this stage of growth that the fermentation liquor is usually and preferably separated.

The manner of addition of the steroid desired to be oxygenated to the oxidizing bacterium, bacterial medium, or fermentation beer, does not appear to be critical. The addition may be accomplished in any suitable manner so as to promote intimate contact of the steroid with the bacterium and/or bacterial enzymes, such as by growing the bacterial organism in the presence of finely comminuted crystals of the steroid, dispersing the steroid throughout the bacterial medium, or in like manner. To this end, surface-active agents, dispersing agents, or suspending agents, such as commercially available Spans, Tweens, Aerosols, Nacconols and the like, may be employed, if desired. However, it is preferred to add the steroid to the bacterial medium, or to the fermentation beer in the form of a water-miscible organic solvent solution, such as a solution in acetone, alcohols, or even ether, which is only sparingly water-miscible, and thereafter to admix the medium and steroid thoroughly so as to form a suspension or dispersion of fine steroid particles and promote a maximum contact of the steroid to be oxidized with the oxidizing bacterium or bacterial enzymes. Either submerged or surface culture procedures may be employed with facility, although submerged culture is preferred. Alternatively, the fermentation liquor of a growth of the bacterium may be separated, admixed with the steroid or a solution thereof, and the mixture subjected to aerobic conditions to accomplish oxygenation of the steroid.

The temperature employed during the period of bacterial oxidation of the steroid need be no different than in the absence of steroid, viz, it should only be maintained within such ranges as support life or active growth of the bacterial organism. The incubation temperature during bacterial oxidation of steroid may thus be, for example, between about fifteen and about forty degrees centigrade, with room temperature, e. g., twenty to thirty degrees centigrade, being preferred for optimum action of the bacterial organism or enzymes.

The conditions under which the bacterial organism is grown are aerobic, and the degree of growth appears related to the vigor of the aeration. Therefore, while any form of aerobic incubation is satisfactory, vigorous aeration, as by agitation and/or blowing air through the culture medium, is usually employed to obtain maximum growth of bacterial organism, which in turn appears to reduce the time required for conversion of the desoxysteroid to eleven oxygenated steroid. The rate of conversion of the desoxysteroid to 11-oxygenated steroid thus appears related either to the rate of aeration, or to the extent of bacterial growth at the time of addition of the steroid, it having been found that conversions, using either the bacterium or the fermentation medium alone, are more rapid when the extent of aeration is greater and also when the bacterium is allowed to grow for from 24-72 hours prior to addition of steroid to be oxidized. This would indicate that the oxygenating enzyme mechanism of the bacterium was fully developed after this period of growth, and that aeration either enhances conversions and speed of conversions by increasing the growth rate of the bacterial organism, with corresponding increase in the rate of development of the oxygenation enzyme mechanism, or that aeration merely aids in the oxygenation by increasing the supply of available oxygen. The foregoing theoretical explanation is to be understood as illustrative only, and not to be a limitation on the invention, since surface culture procedure without agitation or other means of aeration is operative without further aeration, and also since the steroid can be added to the culture medium at the time of inoculation with the bacterial organism without detracting from operativeness of the process.

The time required for the bio-oxygenation of the desoxysteroid by the oxygenating bacterial organisms or the oxygenating enzymes thereof can not be stated definitely, since various factors must be taken into consideration. From about one to seventy-two hours have been found satisfactory for conversions of desoxysteroid to 11-ozygenated steroid by the action of the oxidizing bacteria or oxidizing enzymes thereof. However, indications are to the effect that oxygenation of the steroid begins substantially immediately upon exposure to the fermentation beer of a fully grown oxidizing bacterium or oxidizing enzymes thereof, a growth of the bacterium being considered fully grown in from twenty-four to seventy-two hours, depending to some extent on the extent of aeration employed. When the steroid is added to the fermentation medium at the same time as the medium is inoculated with the bacterial organism, longer periods of time are indicated for high conversions of desoxysteroid, and, as indicated previously, this is believed due to the fact that the oxidizing enzyme mechanism of the bacterium is not fully developed until after some period of bacterial growth. Accordingly, when the steroid is added at the time of inoculation of the medium, periods of from eight to seventy-two hours are usually employed, the length of the period varying inversely with the extent of aeration employed. On the other hand, when the steroid is added to the bacterium, bacterial medium, or bacterial enzymes in the fermentation liquor after substantial growth of the bacterial organism, e. g., after about twenty-four hours, the conversion of the desoxysteroid to 11-oxygenated steroid begins immediately and high yields are obtained in from one to seventy-two hours, or even shorter or longer periods, again depending on the extent of aeration employed.

After completion of the oxygenating fermentation reaction, the 11-oxygenated steroid is recovered from the fermentation reaction mixture in any suitable manner. An especially advantageous manner of recovering the oxygenated steroid involves extracting the oxygenation reaction mixture, including especially the fermentation liquor and mycelia in cases where the steroid is added directly to the culture, with an organic solvent, such as eighty percent acetone, a halogenated hydrocarbon, e. g., methylene chloride, ethylene chloride or chloroform, ethers, and the like, either directly or after acidification to lower pH ranges, e. g., to a pH of one, with mineral acid. The cycelia is reextracted with solvent and discarded. The combined filtrates are distilled in vacuo. The residue is adjusted to a twenty percent acetone solution, extracted with petroleum ether or hexane, the extract back-washed with twenty percent acetone solutions combined and extracted with ethylene dichloride. The aqueous residue is discarded, the ethylene dichloride fraction distilled in vacuo, and the solute transferred to ethyl acetate. The ethyl acetate solution is then washed successively with dilute alkali, dilute acid, and water, until attainment of a neutral pH. This neutral hormone concentrate may be chromatographed on a column and the fractions containing the conversion products used for crystallization of the eleven oxygenated steroid. Other procedures for the extraction may also be used, and will be apparent to one skilled in the art. The crystalline material may be characterized by known procedure therefor, such as by element analyses, melting point, infrared, X-ray diffraction, ultraviolet, microcombustion, and other determinations. Alternatively, the crystalline material or extracts of non-crystalline material, produced by the bio-oxidation, may be identified or characterized according to the Zaffaroni paper chromatogram system, described in detail hereinafter.

An especially useful procedure in the separation of oxidation products produced according to the method of the present invention is the chromatography of extracts or solid materials on an ethylene-glycol coated silica column, fluorosil (magnesium silicate type) or other chromatographic column, the neutral extract or solids being first dissolved in acetone, methylene chloride, or other convenient solvent, the solution absorbed on filter paper discs, solvent removed by a vacuum distillation to leave the solids in a dry state on the discs, the discs placed on the top of the column, and the column developed with solvents or solvent mixtures, each saturated with ethylene glycol when the ethylene glycol-silica column is employed. This is especially useful in identifying the compounds produced by the oxygenation, since each fraction from the column may be tested, if desired, by the Zaffaroni procedure. As little as ten to forty micrograms of material may be tested by the Zaffaroni paper chromatogram system, chemical individuals identified, fractions containing the same chemical individuals combined, and the compound crystallized from the combined fractions.

The Zaffaroni technique, mentioned throughout the specification and examples, is a relatively new but already well-established procedure for the identification of certain organic compounds, viz, the adrenal cortical hormones and related compounds, which analytical method is based in part on the polarity of the compound tested. Literature references to this method of analysis are as follows: Burton, Zaffaroni, and Keutmann, "A New Analytical Method for Adrenal Cortical Hormones," Science 110, 442 (1949) and Zaffaroni, Burton, and Keutmann, Science 111, 6 (1950). Since the polarity of organic compounds varies with variations in the molecule, including presence or absence of certain groups (each of which groups itself introduces a certain definite effect on the polarity of the molecule as a whole), and including variations of the positions of a given group in a given molecule, it is possible, by the Zaffaroni technique, to positively identify minute quantities of an organic compound of the adrenal cortex steroid series, or related steroid compounds, by their polarity. That different compounds exhibit different polarities has long been known, but the Zaffaroni technique is at present, the only practical procedure for utilizing polarity differences for the identification of minute quantities of steroid compounds. This procedure, referred to throughout the specification and examples, proved an immense aid in investigating the bio-oxidation of steroids by oxidizing bacterial organisms or oxidizing enzymes thereof, and in the identification of various new and hitherto unknown oxygenated steroids, as well as in the identification of known oxygenated steroids.

The procedure of Zaffaroni et al. is a form of known "paper strip chromatography," and employs essentially the same principles as does ordinary partition chromatography as practiced using a suitable column.

The method of Zaffaroni et al. is essentially as follows: First, a suitable grade of filter paper, three to four inches wide and approximately 22 inches long, is folded at a point about three inches from one end. At a point one and one-half inches below this fold, a line is drawn across the paper, marking the point for application of the steroid to be tested to the paper. The paper is then cut along its length into strips approximately three-eighths inches in width, beginning at the end opposite the end at which the steroid to be tested is to be applied. This leaves several ribbons of the paper, all of which are attached to a common tail, and which may, if desired, be left attached to a tail at both ends. Each of these ribbons provides a separate "track" for each "spot" of compound tested, as will be more readily apparent from the following. Alternatively, the paper is not cut into separate tracks, and a single strip is used. In such case, however, care must be taken not to place the several compounds being tested too close together, e. g., closer than about an inch, on the single paper strip. Next, a solvent system, consisting of a nonpolar solvent for the mobile phase, and a polar solvent for the stationary phase, is selected. The nonpolar solvent benzene and the polar solvent formamide constitute one solvent system, and the nonpolar solvent toluene and the polar solvent propylene glycol constitute another solvent system, both of which have been successfully employed.

The filter paper is then saturated with the polar solvent, e. g., propylene glycol, and any excess removed from the paper with additional quantities of filter paper, a squeegee, an ordinary clothes ringer, or in any other suitable manner. The mobile phase (also called "developing") nonpolar solvent, in this case toluene, is then saturated with the polar solvent, and the various elements are ready for assembly.

A battery jar of suitable dimensions, e. g. twelve by eighteen inches, containing 100 milliliters of the nonpolar phase solvent, is lined with a large sheet of filter paper soaked in the stationary phase polar solvent to be employed, e. g., propylene glycol. A ring stand inside the chamber supports an instrument tray containing 350 milliliters of the mobile phase or developing solvent, e. g., toluene, which is, as previously stated, saturated with the stationary phase solvent, e. g., propylene glycol. The short fold, or common tail, of the paper is inserted into the reservoir of the developing solvent, e. g., the mobile phase nonpolar solvent toluene, which has been saturated with propylene glycol.

The steroid to be tested, in acetone, methylene chloride, methanol, or chloroform, is applied to the point of application approximately one and one-half inches below the fold with a micropipette in an amount of approximately ten to 300 micrograms after the strip has been cut and saturated with the stationary phase, e. g., propylene glycol, but before inserting the tail into the reservoir. The chamber is then closed with a glass cover and sealed with a starch-glycerine paste.

The mobile phase liquid then flows by adsorption over the downwardly suspended filter paper, thus "developing" the strips. These strips are developed for from three to seventy-two hours or longer, depending upon the solvent system and the particular steroids involved. After proper development, as determined by the mobilities of the compounds, the paper strips are dried at room temperature with a fan. The spots of unsaturated steroid can be made visible by utilizing their ability to absorb ultra-violet light, according to Haines and Drake, Fed. Proc. Am. Soc. Exp. Biol. 9, 180 (March 1950). This development is applicable in the case of steroids having a conjugated double bond system, e. g., progesterone, corticosterone, 11-desoxycorticosterone, 11-dehydrocorticosterone, 11 - dehydro-17-hydroxycorticosterone, 17 - hydroxycorticosterone, 11-desoxy-17-hydroxycorticosterone, and the like. The steroid spot, originally present at the point of application, is found to have moved, with the mobile phase, a distance proportional inversely to its attraction to the stationary phase and also dependent upon its distribution coefficient between the two solvents and the adsorption-elution coefficient existing between the filter paper and the solvent system. Affinity toward the stationary phase, e. g., propylene glycol, is greatest for the steroid compounds with the greatest number of hydroxy groups, and therefore these compounds move away from the point of application more slowly than do the steroids containing a lesser number of hydroxy groups. Desoxycorticosterone, with three oxygen atoms, moves the fastest of the known corticosteroids, while the corticosteroids containing four oxygen atoms move more slowly and the corticosteroids containing five oxygen atoms move the slowest of the known corticosteroid compounds. The following Table I shows the arrangement of some of the known corticosteroids according to the number of oxygens and their mobilities, and Table II shows the relative mobilities of certain steroids using the propylene glycol-toluene chromatogram solvent system.

TABLE I

| | Name |
|---|---|
| $O_2$ | Progesterone. |
| $O_3$ | 11-Desoxycorticosterone. <br> 17-Hydroxyprogesterone. <br> 11-Dehydrocorticosterone. |
| $O_4$ | 17-Hydroxy-11-desoxycorticosterone (S). <br> Corticosterone. |
| $O_5$ | 17-Hydroxy-11-dehydrocorticosterone (E). <br> 17-Hydroxycorticosterone (F). |

(Order of descending mobility.)

TABLE II

*Relative mobilities of several steroids in paper chromatogram studies (descending order of mobility)*[1]

Propylene glycol-toluene system:
    11-desoxycorticosterone
    17-hydroxyprogesterone
    11-alpha-hydroxyprogesterone (U–III)
    Corticosterone
    17-hydroxy-11-desoxycorticosterone (S)[2]
    20-alpha-,21-dihydroxy-4-pregnen-3-one[2]
    20-beta-,21-dihydroxy-4-pregnen-3-one
    17-hydroxy-11-dehydrocorticosterone (E)
    Dihydroxyprogesterone (U–I)
    17-hydroxycorticosterone (F)

(Faster moving steroids toward top of table)
[1] Order of mobility HO>esters>ketones in any given position in any given compounds.
[2] Don't distinguish on this system.

Reference is made to the accompanying drawings which are photographic reproductions of certain analytical results obtained according to the method of the present invention or which are pertinent to the present invention.

In the drawings:

Figure 1 is a photograph of a paper strip chromatogram of an aliquot of the neutral hormone extract of Example 1. This figure is further referred to in Example 1.

Figure 3 is a photograph of a paper strip chromatogram of aliquots taken from Bands I and II of the partition chromatogram, the graph of which is shown in Figure 2. This figure is further referred to in Example 1.

Figure 4 is a photograph of a paper strip chromatogram of aliquots taken from Bands III, IV, and V of the partition chromatogram, the graph of which is shown in Figure 2. This figure is further referred to in Example 1.

Figure 5 is a photograph of a paper strip chromatogram of aliquots taken from Bands VI, VII, and VIII of the partition chromatogram, the graph of which is shown in Figure 2. This figure is further referred to in Example 1.

Figure 10 is a photograph of a paper strip chromatogram of an aliquot of the neutral hormone extract of Example 2. This figure is further referred to in Example 2.

Figure 12 is a photograph of a paper strip chromatogram of an aliquot taken from Bands II, III, IV, and V of the partition chromatogram, a graph of which is shown in Figure 11. This figure is further referred to in Example 2.

Figure 13 is a photograph of a paper strip chromatogram of an aliquot taken from Band VI of the partition chromatogram, a graph of which is shown in Figure 11. This figure is further referred to in Example 2.

Figure 14 is a photograph of a paper strip chromatogram of an aliquot of the neutral hormone fraction of Example 3. This figure is further referred to in Example 3.

Figure 16 is a photograph of a paper strip chromatogram of an aliquot of the neutral hormone extract of Example 4. This figure is further referred to in Example 4.

Figure 17 is a photograph of a paper strip chromatogram of aliquots taken from Bands I, II, and a region between Bands II and III of the partition chromatogram, a graph of which is shown in Figure 15. This figure is further referred to in Example 4.

Figure 18 is a photograph of a paper strip chromatogram of aliquots taken from Bands III, IV, and V of the partition chromatogram, a graph of which is shown in Figure 15. This figure is further referred to in Example 4.

Figure 19 is a photograph of a paper strip chromatogram of aliquots taken from Bands V, a region between Bands V and VI, and Band VI of the partition chromatogram, a graph of which is shown in Figure 15. This figure is further referred to in Example 4.

Figure 20 is a photograph of a paper strip chromatogram of aliquots taken from Bands VI, VII, and VIII of the partition chromatogram, a graph of which is shown in Figure 15. This figure is further referred to in Example 4.

Figure 21 is a photograph of a paper strip chromatogram of the neutral hormone extract of Example 5. This figure is further referred to in Example 5.

Figure 22 is a photograph of a paper strip chromatogram of the neutral hormone extract of Example 7. This figure is further referred to in Example 7.

Figure 24 is a photograph of a paper strip chromatogram of an aliquot taken from Band II of the partition chromatogram, the graph of which is shown in Figure 23. This figure is further referred to in Example 7.

Figure 25 is a photograph of a graph comparing the infrared spectrum of material from Band III of the partition chromatogram, a graph of which is shown in Figure 23, with that of the same material obtained in a different manner. This figure is further referred to in Example 7.

Figure 26 is a photograph of a paper strip chromatogram of material taken from Band III of the partition chromatogram, a graph of which is shown in Figure 23. This figure is further referred to in Example 7.

Figure 27 is a photograph of a paper strip chromatogram of an aliquot taken from Bands IV and V of the partition chromatogram, the graph of which is shown in Figure 23. This figure is further referred to in Example 7.

Figure 28 is a photograph of a paper strip chromatogram of an aliquot of the neutral hormone extract of Example 15. This figure is further referred to in Example 15.

Figure 29 is a photograph of a paper strip chromatogram of an aliquot of the neutral hormone extract of Example 16. This figure is further referred to in Example 16.

Figure 30 is a photograph of a paper strip chromatogram of an aliquot of the neutral hormone extract of Example 17. This figure is further referred to in Example 17.

Figure 31 is a photograph of a longer period paper strip chromatogram of an aliquot of the neutral hormone extract of Example 17. This figure is further referred to in Example 17.

Figure 2:
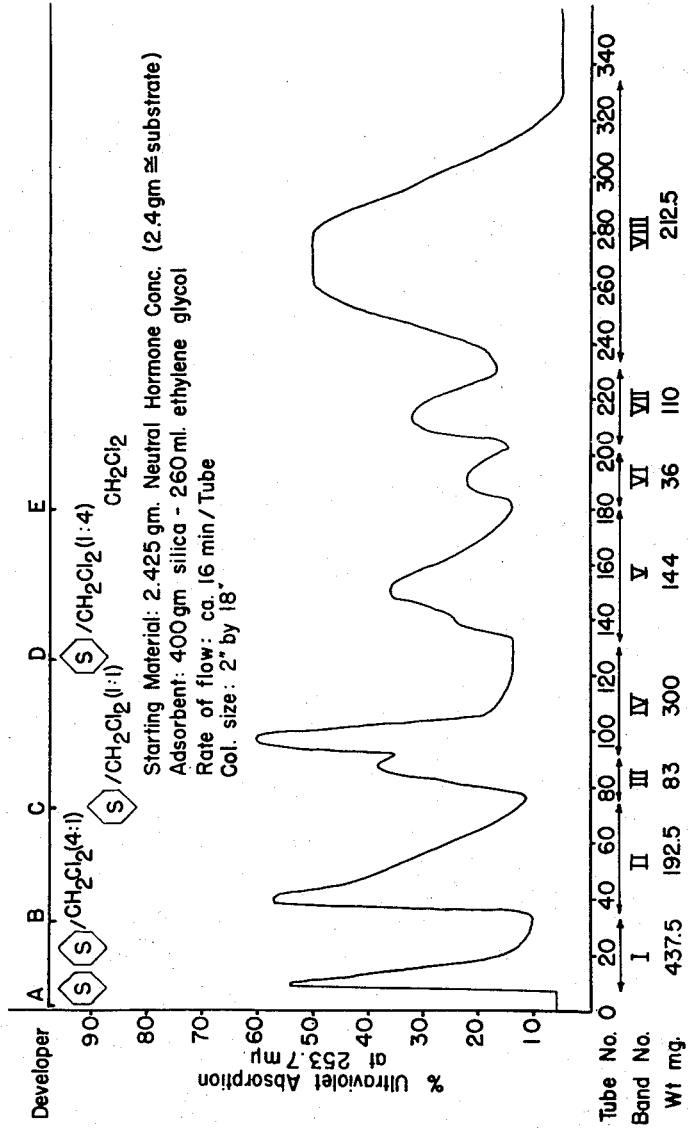
Figure 2 is a photograph of a graph of percent ultraviolet absorption against the number of tubes of effluent obtained by partition chromatography of the neutral hormone extract of Example 1. This figure is further referred to in Example 1.

The factors involved in the Zaffaroni et al. procedure are essentially as follows: (a) Affinity of steroid compounds of differing polarities for the more polar of two solvents. Thus, the more polar steroid compounds, such as those containing a hydroxy group or groups, will have greater attraction to the polar solvent than the less polar compounds, such as those containing no hydroxy groups, which in part determine in which phase the steroid will exist, and how fast its spot will move; (b) The distribution coefficient of the steroid compound being tested between two immiscible solvents, which will determine to some extent the phase in which the steroid will exist, as between the two phases produced by mixture of two immiscible solvents, and how fast its spot will move; (c) The adsorption-elution coefficient of the steroid tested, placed on a pretreated strip of filter paper and exposed to a mixture of two immiscible solvents, which again determines to some extent in which phase the steroid will exist, and how fast its spot will move.

The combination of these three factors determines to which point on the paper chromatogram strip the spot of steroid will move, relative to a spot of a known compound. The time allowed for development of the strip by means of the mobile phase is thus immaterial, within certain limits, since it is the relative location of the spot with respect to a known control which identifies the compound tested by this method. This will be readily apparent from a careful observation of the paper chromatogram photographs which accompany the following examples and are identified therewith. Each spot on the paper chromatogram should be understood to identify an individual compound, the less polar compounds, being faster moving, traveling to a position further from the point of origination than the more polar, more highly oxygenated compounds which are tested in the same run. Not only is it possible thus to identify qualitatively the steroid compound tested, but it is also possible, by comparison to an appropriate control of known quantity, to determine the approximate amount of that particular compound. Alternatively, it is possible to cut the region from the papergram containing the steroid to be evaluated, extract it with an organic solvent (alcohol, acetone, etc.), and measure the amount of ultraviolet absorption. It is therefore possible to determine the approximate biooxidation conversion of a particular starting steroid to various more highly oxygenated derivatives, since the amount of steroid employed in the original application to the strip being known, it involves but a simple observation of the number of spots of different more highly oxygenated steroid compounds and a comparison of the relative brightness, density, or ultraviolet absorption to arrive at an approximation of the conversion to and yield of a particular steroid biooxidation or other transformation product.

Since the eleven desoxysteroids show no activity of any significance when measured by the glycogen deposition assay test of Pabst et al., Endocrinology 41, 55 (1947), the Pabst glycogen deposition assay test has accordingly been used in many of the examples to show the conversion of eleven desoxysteroids to corresponding eleven oxygenated steroids by the process of the present invention, the eleven oxygenated steroids being known to exhibit considerable potency when measured by the glycogen deposition test.

The following examples are to be understood as illustrative only, and are in no way to be construed as limiting the invention.

EXAMPLE 1 (PM 58)

A vegetative seed from a neomycin culture (*Streptomyces fradiae* strain 3535) was prepared by growing the culture for three days at 24 degrees centigrade in reciprocating shaker flasks on a medium consisting of:

| | | |
|---|---|---|
| Cerelose (crude dextrose) | grams | 10 |
| Distiller's solubles | do | 5 |
| Potassium chloride | do | 4 |
| Brewer's yeast | do | 10 |
| Calcium carbonate | do | 1 |
| Tap water | liter | 1 |

This medium was sterilized for thirty minutes at fifteen pounds pressure prior to inoculation.

The resulting seed was used to inoculate a medium consisting of:

| | | |
|---|---|---|
| Cerelose (crude dextrose) | grams | 25 |
| Soybean meal | do | 25 |
| Sodium chloride | do | 5 |
| Calcium carbonate | do | 5 |
| Distiller's solubles | do | 5 |
| Cobaltous chloride hexahydrate | milligram | 1 |
| Tap water | liters | 1 |

The seeding rate was five milliliters of liquid vegetative seed per 100 milliliters of medium. One hundred milliliters of medium was employed per flask and the 150 flasks of medium used were first prepared and then sterilized at fifteen pounds pressure for thirty minutes prior to inoculation.

The culture was allowed to grow for 41 hours, with shaking on a rotary shaker, at 24 degrees centigrade, whereafter a sterile ethanol solution of five grams of 11-desoxy-17-hydroxycorticosterone (Compound S) was added at a concentration of 33.3 milligrams in three milliliters of ethanol per 100 milliliters of beer. The culture was then incubated for an additional seven hours, whereafter the flask contents (fifteen liters) were pooled and an equal volume of acetone added thereto.

To this mixture was added an additional 45 liters of acetone, bringing the concentration to eighty percent acetone. The mixture was stirred for two hours, filtered, the precipitate washed with 25 liters of eighty percent acetone, the suspension of the filtration residue stirred for two hours, filtered, the filter cake discarded, and the acetone filtrate combined with the acetone filtrate from the first filtration. The combined filtrates were evaporated in a vacuum at a temperature below fifty degrees centigrade. The resulting aqueous residue was adjusted to a twenty percent acetone solution by addition of four liters of acetone, the solution washed with five one-third volumes of mixed hexanes, the combined hexane washes extracted with two one-tenth volumes of twenty percent acetone, the hexane residue set aside, and the two twenty percent acetone extracts combined with the previous twenty percent acetone main fraction and the combined twenty percent acetone extract then extracted with six one-fourth volumes of ethylene dichloride. The resulting aqueous residue was set aside and the combined ethylene dichloride fractions then washed with one-tenth volume of distilled water and the ethylene dichloride distilled in vacuo at less than fifty degrees centigrade. The residue was dissolved in ethyl acetate, and the solution washed with the following:

2 ⅕ volumes aqueous sodium bicarbonte
1 1/10 volume water
3 1/10 volumes two percent aqueous sodium carbonate
1 1/10 volume water
3 1/10 volumes 0.5 normal hydrochloric acid
1 1/10 volume water
3 1/10 volumes three percent aqueous sodium bicarbonate
4 1/10 volumes distilled water, or until neutral Each aqueous wash residue was passed through an ethyl acetate fraction, and all of the ethyl acetate fractions then combined to make up a neutral hormone fraction.

Glycogen deposition assays by the method of Pabst et al. indicated recovery of 0.28 glycogen units per milligram of extract. The theoretical conversion to Compound F (17-hydroxycorticosterone) was therefore 2.8 percent, the glycogen unit being that amount of bioactivity equivalent to one milligram of 17-hydroxycorticosterone (Compound F).

Figure 1, entitled "Paperchromatogram PM 58, Example 1," shows the results of paper chromatography of a 54-gamma aliquot of the neutral hormone concentrate from this experiment by the technique of Zaffaroni et al., using a toluene-propylene glycol solvent system. Chromatography was continued for sixteen hours. In channel A there is good evidence of seven spots. The identity of these spots can be ascertained by comparison with the location of spots in channel B, which contains known compounds. It is thus seen that spots 1, 2, 3 and 4 in channel A remain unidentified, whereas spot 5 can be identified as Compound F and spot 6 as Compound E. In addition, spot 7 is identified as Compound S.

Another aliquot of the neutral hormone concentrate, amounting to 2.425 grams, was subjected to column partition chromatography. This starting material was dissolved in a minimum amount of methylene chloride and absorbed onto three filter pad discs which had been prewashed. The chromatographic adsorbent consisted of 400 grams of silica gel containing 260 milliliters of ethylene glycol. The size of the column was two inches in diameter by eighteen inches in height. The rate of flow was approximately sixteen minutes per sixty milliliters of effluent. The results of this chromatogram are charted in Figure 2. Five developing solvents were used: Cyclohexane, cyclohexane/methylene chloride (4:1), cyclohexane/methylene chloride (1:1), cyclohexane-methylene chloride (1:4), and methylene chloride. The results are plotted so that the vertical axis represents percent ultraviolet absorption at 253.7 mμ against the horizontal axis consisting of effluent tube members. Each tube contains sixty milliliters of effluent. The ultraviolet absorption curve indicates that eight chromatographic bands were obtained, having the weights shown in the accompanying Figure 2. The material in these bands was then analyzed further by paper chromatography.

In Figure 3, entitled "Paperchromatogram PM 58, Example 1," 85 gammas of Band I and 77 gammas of Band II are compared to the standard compound, 11-desoxycorticosterone. In channels A and B there is only one unidentified spot.

Figure 4, entitled "Paperchromatogram PM 58, Example 1," indicates the following characterization for Bands III, IV, V. In this case the comparison standards are in channel A, and they are identified as Compound F, Compound E, and Compound S.

A 72-gamma aliquot of Band V separated in channel B into four distinct spots. Spots 1, 2 and 3 are unidentified, except that spot 2 is in the Compound F region. Spot 4 is identified as Compound E.

A 60-gamma aliquot of Band IV separated in channel C into two spots. Spot 1 remains unidentified and spot 2 is identified as Compound S.

An 83-gamma aliquot of Band III was separated in Channel D into two unidentified spots.

In Figure 5, "Paperchromatogram PM 58, Example 1," the standard compounds may be found in channel D. A 72-gamma aliquot of Band VI separated in channel C into three unidentified spots.

A 55-gamma aliquot of Band VII separated in channel B into three spots, the first two being unidentified. Spot 3 is identified as Compound F.

An 85-gamma aliquot of Band VIII was analyzed in channel A. Two spots were obtained. Spot 1 is unidentified and spot 2 appears to be a trace of Compound F.

Figure 6:
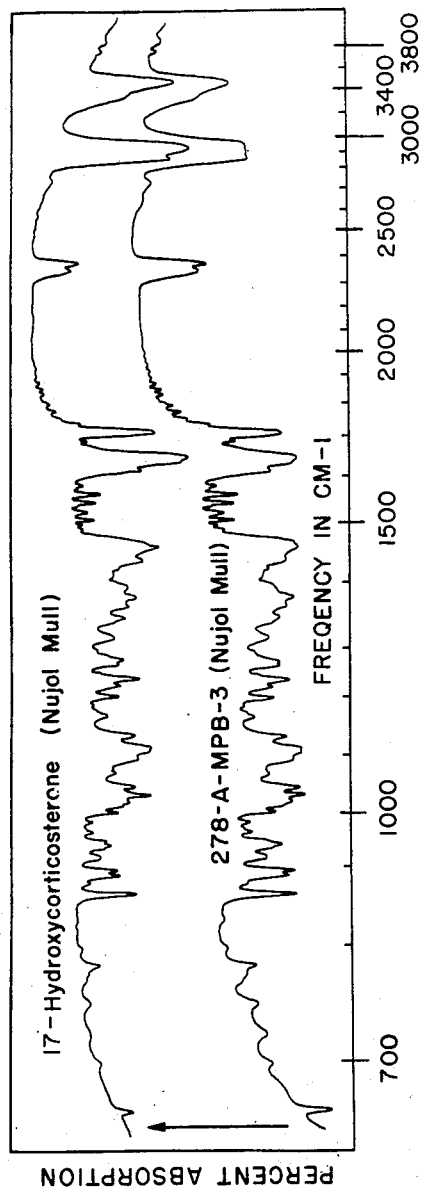
Figure 6 is a photograph of a graph comparing the infrared spectrum of authentic 17-hydroxycorticosterone (Compound F) with that of a sample of crystals from Band VII of the partition chromatogram, a graph of which is shown in Figure 2. This figure is further referred to in Example 1.

A sample of 110 milligrams from Band VII was crystallized from the minimum amount of absolute acetone in the cold. The first crop of crystals, weighing 22.8 milligrams, were separated by filtration. This material was given the code 278-A-MPB-3. It was identified as 17-hydroxycorticosterone (Compound F) by means of infrared spectroscopy of a Nujol mull. The infrared spectrum of this material is compared with a comparable spectrum of an authentic sample of 17-hydroxycorticosterone in Figure 6. Minor differences, which are seen in the two curves, can be explained on the basis of the expected variability between different Nujol mulls of identical materials.

Figure 7:
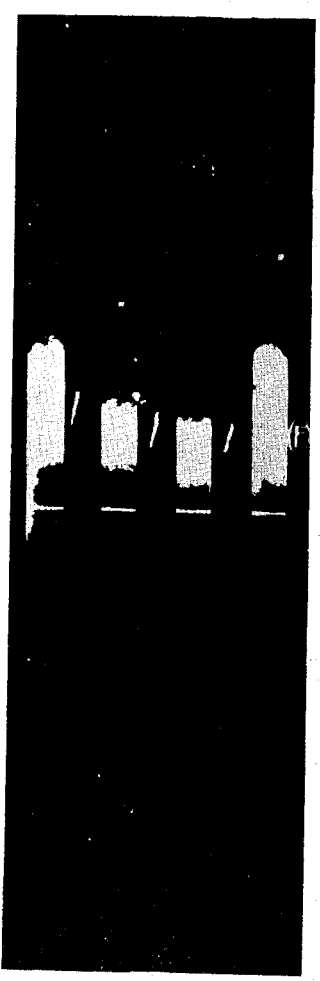
Figure 7 is a photograph of a paper strip chromatogram of an aliquot of material from Band VII of the partition chromatogram, a graph of which is shown in Figure 2, in comparison with authentic 17-hydroxycorticosterone (Compound F). This figure is further referred to in Example 1.

Additional data, besides infrared absorption curves, indicating the identity of 278-A-MPB-3 with 17-hydroxycorticosterne, is afforded by Figure 7 entitled "Paperchromatogram PM 58, Example 1." In channel D is shown authentic Compound F. In channels B and C, the material to be identified has been chromatographed, and in channel A a mixture of twenty gammas of authentic Compound F and ten gammas of the crystals isolated have been mixed and chromatographed. It is seen that no resolution is obtained in channel A which, together with consideration of the location of spots, further indicates 278-A-MPB-3 to be Compound F (17-hydroxycorticosterone).

Figure 8:
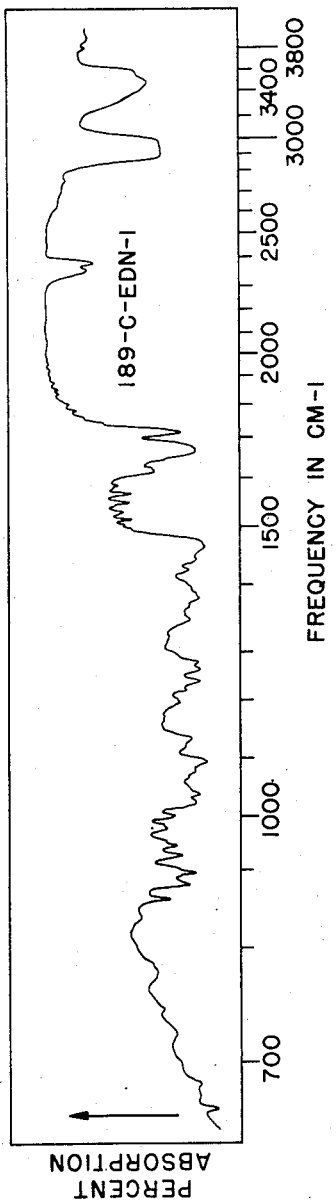
Figure 8 is a photograph of an infrared spectrum of material obtained from Band VIII of the partition chromatogram, a graph of which is shown in Figure 2. This figure is further referred to in Example 1.
Figure 9:
Figure 9 is a photograph of a paper strip chromatogram of an aliquot of material from Band VIII of the partition chromatogram, a graph of which is shown in Figure 2. This figure is further referred to in Example 1.

Additional crystalline material was obtained from the mother liquors, and this was also identified as 17-hydroxycorticosterone. An aliquot of material from Band VIII was submitted for infrared spectroscopy. The curve for this material, which was given the number 189-C-EDN-1, is shown in Figure 8. A crystalline material, which remains unidentified at the present time, was isolated from this fraction. It has been given the trivial name "MPF-1." Characterization of this material was obtained by paper chromatography as reported in Figure 9, entitled "Paperchromatogram PM 58, Example 1," where it is seen that the material moves more slowly than Compound F.

EXAMPLE 2 (PM 34)

In this experiment, 200 milligrams of Compound S were incubated with Neomycin (*Streptomyces fradiae*, Strain 3535) for seven hours in the manner of Example 1. A total of six flasks, or 600 milliliters of beer, was used. Glycogen assays indicated recovery of 0.22 unit per milligram of substrate. This is equivalent to a theoretical conversion to Compound F of 2.2 percent. After obtaining the neutral hormone extract as in Example 1, a 165-gamma sample of the neutral hormone concentrate was subjected to paper chromatography as shown in Figure 10, entitled "Paperchromatogram PM 34, Example 2."

Figure 11:
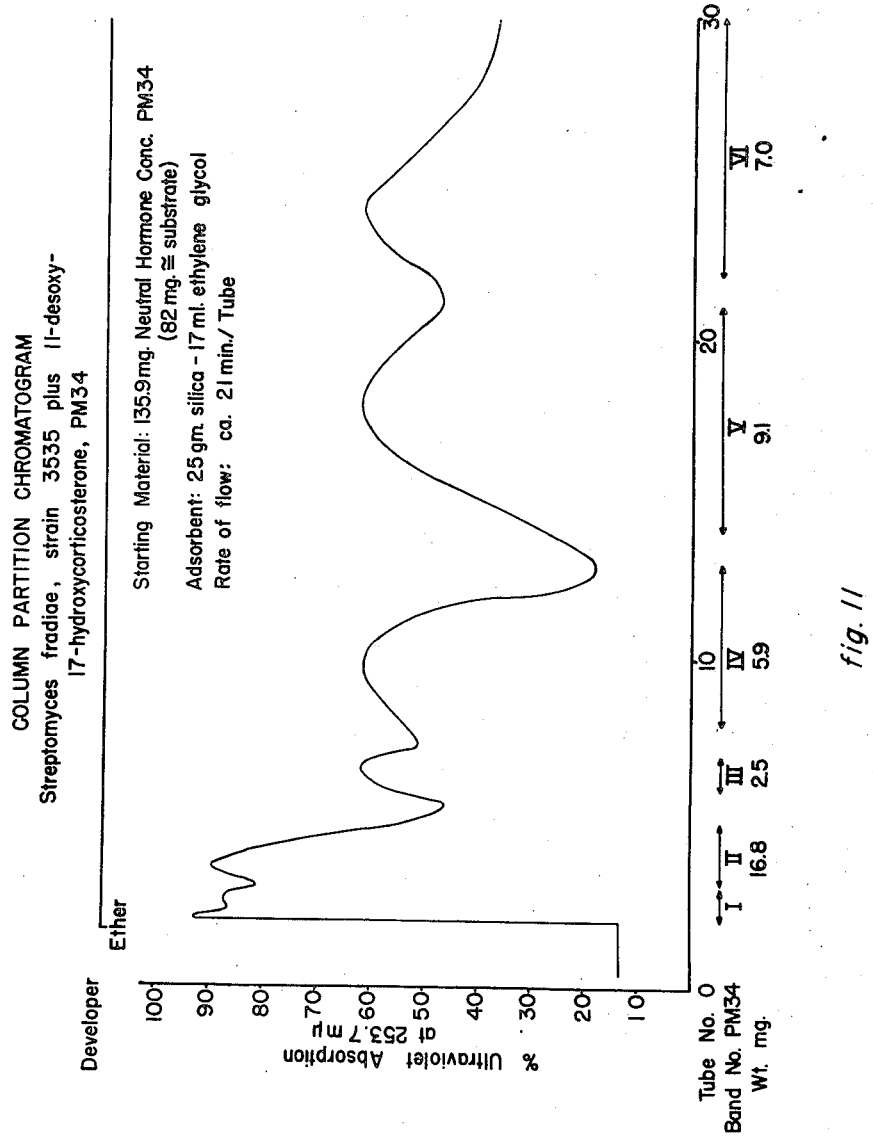
Figure 11 is a photograph of a graph of percent ultraviolet absorption against the number of tubes of effluent obtained by partition chromatography of the neutral hormone extract of Example 2. This figure is further referred to in Example 2.

Standard compounds F and E are shown in channel B. Three major spots in channel A are seen. A portion of spot 1 is in the Compound F region, spot 2 is in the Compound E region, and spot 3 is seen to move more slowly than corticosterone and is thus in the Compound S region. A 135.9 milligram aliquot of the neutral hormone concentrate from this fermentation was subjected to column partition chromatography. This starting material was dissolved in the minimum acetone and used to saturate four filter pad discs. The discs were dried in vacuo. The adsorbent consisted of 25 grams of silica containing seventeen milliliters of ethylene glycol. The rate of flow was approximately 21 minutes per sixty milliliters. The column was developed with diethyl ether saturated with ethylene glycol. The results of this chromatogram are shown in Figure 11, where percent ultraviolet absorption at 253.7 m$\mu$ is plotted against the tube numbers. Each tube contains sixty milliliters of effluent. On the basis of ultraviolet absorption, it is seen that six bands were obtained, having weights as shown in the above-mentioned figure. Band I was so small that it was ignored in further evaluation. The remaining Bands were evaluated by paper chromatography.

In Figure 12, entitled "Paperchromatogram PM 34, Example 2" it is seen that channels E and F contain standard compounds. A 45-gamma aliquot of Band II was analyzed in channel D, and found to give two unidentified spots.

A 25-gamma aliquot of Band III was chromatographed in channel C and found to give one unidentified spot.

A thirty-gamma aliquot of Band IV was chromatographed in channel D and found to yield three spots. Spot 1 in channel B is unidentified, spot 2 is Compound F, and spot 3 is Compound E.

A thirty-gamma aliquot of Band V was analyzed in channel A, and gave rise to an unidentified spot.

In Figure 13, entitled "Paperchromatogram PM 34, Example 2" a 23-gamma aliquot of Band VI was chromatographed in channel A and found to resolve itself into two unidentified spots, both of which moved more slowly on the paperchromatogram than did Compound F, as seen by comparing channel A with channel B.

EXAMPLE 3 (PM-55)

*Culture—Streptomyces H-39*

Seed medium:
| | | |
|---|---|---|
| Dextrin | grams | 10 |
| Corn steep liquor | do | 80 |
| Calcium carbonate | do | 1 |
| Sodium chloride | do | 5 |
| Tap water | liter | 1 |

The pH was adjusted to 6.6 with potassium hydroxide.

Fermentation medium.—Same as seed medium.

In this experiment, 200 milligrams of Compound S was incubated with Streptomyces (H-39) for seven hours in the manner of Example 1. The fermentation beer was then split in half. One aliquot was extracted directly according to the procedure of Example 1, while the other aliquot was adjusted to pH one prior to extraction. The neutral hormone concentrates from these two experiments were assayed by the glycogen procedure. The experiment involving straight extraction of the beer yielded 0.35 glycogen unit per milligram of substrate, which is equivalent to a theoretical conversion of 3.5 percent to Compound F. The assay on the aliquot, the pH of which was adjusted to a value of one prior to extraction, indicated 0.30 unit per milligram of substrate. This is equivalent to a theoretical conversion of 3.0 percent to Compound F. The neutral hormone concentrates were analyzed further by paper chromatography as shown in Figure 14, entitled "Papergram PM 55, Example 3." The standard compounds are shown in channel C. A 34-gamma aliquot of the straight-extracted experiment was chromatographed in channel B, giving rise to six spots. Spots 1, 2 and 3 remain unidentified, spot 4 is Compound F, spot 5 is Compound E, and spot 6 is Compound S. Paper chromatography of the neutral hormone concentrate from the pH one experiment as shown in channel A, indicates the production of seven spots. Spots 1, 2, 7, and 5 remain unidentified, whereas spot 3 is Compound F, spot 4 is Compound E, and spot 6 is Compound S.

EXAMPLE 4 (PM 54)

Figure 15:
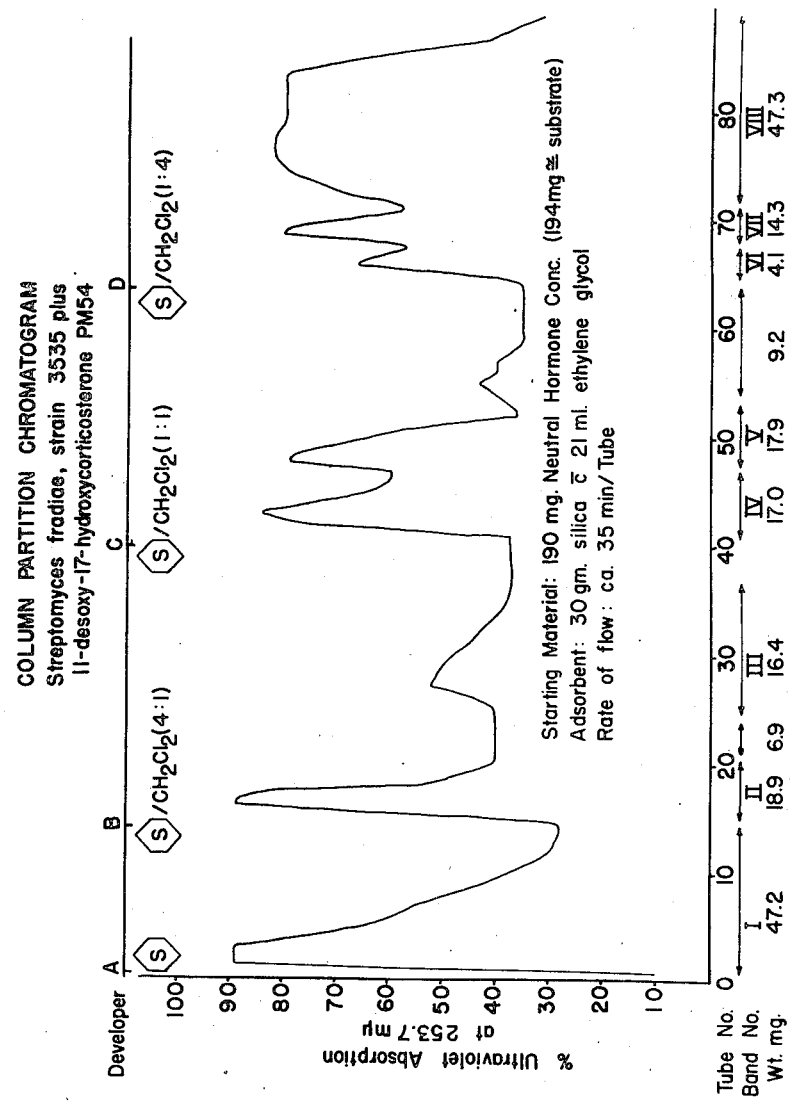
Figure 15 is a photograph of a graph of percent ultraviolet absorption against the number of tubes of effluent obtained by partition chromatography of the neutral hormone extract of Example 4. This figure is further referred to in Example 4.

In this experiment, 200 milligrams of Compound S was incubated with a Neomycin culture in the manner of Example 1. The neutral hormone concentrate, obtained in the manner of Example 1 and amounting to 190 milligrams, was dissolved in a minimum of acetone and transferred to filter paper discs for column partition chromatography. The adsorbent consisted of thirty grams of silica containing 21 milliliters of ethylene glycol. The rate of flow was approximately 35 minutes per sixty milliliters. The data for this chromatogram are shown in Figure 15. The column was developed with four different solvents consisting of cyclohexane, cyclohexane/methylene chloride (4:1), cyclohexane/methylene chloride (1:1), and cyclohexane/methylene chloride (1:4). The results are plotted in Figure 15 in terms of percent ultraviolet absorption at 253.7 m$\mu$ against tube numbers. Each tube contained sixty milliliters of effluent. Eight bands were obtained, having the weights shown in the chart. Both the starting material for this column and the resulting bands were analyzed by paper chromatography. The paperchromatogram for the neutral hormone concentrate prior to column chromatography is shown in Figure 16, entitled "Paperchromatogram PM 54, Example 4." The standard compounds are shown in channel A. Forty gammas of the neutral hormone concentrate were chromatographed in channel C. Three spots were obtained. Spot 1 appears to be Compound F, spot 2 is in the Compound E region, and spot 3 is believed to be Compound S, although it seems to have moved more rapidly than the standard Compound S.

In Figure 17, entitled "Paperchromatogram PM 54, Example 4," the paperchromatograms of the first three regions of the column chromatogram are shown. The standard compounds are in channel D. A 94-gamma aliquot of Band I gave rise to one unidentified spot in channel C.

A 47-gamma aliquot in Band II gave rise to one unidentified spot in channel B.

A 69-gamma aliquot of a region between Band II and Band III gave rise to three unidentified spots, found in channel A.

In Figure 18, entitled "Paperchromatogram PM 54, Example 4," the standard compounds are located in channel D. A 100-gamma aliquot of Band III was chromatographed in channel C and gave rise to one spot, which was identified as Compound S.

A 100-gamma aliquot of Band IV was chromatographed in channel B, giving rise to two spots, one of which is in the Compound E region and the other of which is unidentified.

A 100-gamma aliquot of Band V was chromatographed in channel A and gave rise to two spots. Spot 1 appears to be in the Compound E region, and spot 2 is unidentified.

In Figure 19, entitled "Paperchromatogram PM 54, Example 4," the standard compounds are in channel D. A 100-gamma aliquot of Band V was chromatographed in channel C and gave rise to two spots. Spot 1 is unidentified and spot 2 appears to be in the Compound E region.

A 100-gamma aliquot of material between Bands V and VI was chromatographed in channel B, giving rise to four spots. Spots 1 and 2 are unidentified, while spot 3 is in the compound F region and spot 4 is in the Compound E region.

A 100-gamma aliquot of Band VI was chromatographed in channel A, giving rise to three spots. Spots 1 and 2 are unidentified, while spot 3 appears to be in the Compound F region.

In Figure 20, entitled "Paperchromatogram PM 54, Example 4," the standard compounds are in channel D. A 100-gamma aliquot of Band VI was chromatographed in channel C, giving rise to three spots. These are unidentified.

A 100-gamma aliquot of Band VII was chromatographed in channel B. Three spots were obtained, of which 1 and 2 are unidentified, while spot 3 is Compound F. A 100-gamma aliquot of Band VIII was chromatographed in channel A giving rise to one unidentified spot.

EXAMPLE 5 (PM 61)

The medium used for preparation of vegetative neomycin seed contained the following ingredients per liter: crude dextrose, ten grams; brewer's yeast, ten grams; distiller's solubles, five grams; potassium chloride, four grams. One hundred milliliters of medium were sterilized in 500-milliliter Erlenmeyer flasks at fifteen pounds steam pressure for thirty minutes. After cooling, four flasks were inoculated from an agar slant of *Streptomyces fradiae* strain 3535 and placed on a reciprocating shaker in a 24 degrees centigrade incubator for three days. The growth of the culture was heavy, and was used to start the fermentation in the five gallon bottle described below.

Eight liters of medium of the following composition: 25 grams cerelose, 25 grams soybean meal, five grams sodium chloride, five grams calcium carbonate, five grams distiller's solubles, one milligram of cobalt dichloride hexahydrate, and one liter of tap water were sterilized in a five gallon bottle at fifteen pounds steam pressure for sixty minutes. The bottle was equipped with an agitator, a tube for introducing air at the bottom of the bottle, a cotton filter to sterilize the air, a device for obtaining samples, and an air outlet equipped with a filter. After cooling of the medium, the eight liters of sterile medium were inoculated with 400 milliliters of the above-described vegetative seed, placed in a water bath held at 24-26 degrees centigrade, stirred at 270 revolutions per minute, and aerated at a rate of six liters of air per minute. Sterile lard oil was added as needed to reduce foaming.

Forty-seven hours after seeding, 2.7 grams of Compound S in 270 milliliters of ethyl alcohol was added to the fermentation. This solution had been sterilized by filtration through an ultrafine sintered glass filter. The fermentation was carried on for an additional seven hours, the bottle then removed from the water bath, eight liters of acetone added to the eight liters of beer, and stored in a cold room until extracted. Glycogen assays indicated a recovery of 0.58 unit per milligram of substrate, which is equivalent to a theoretical conversion of 5.8 percent to Compound F. The paperchromatograms of two 57-gamma aliquots of the neutral hormone concentrate are presented in Figure 21, entitled "Paperchromatogram PM 61, Example 5." The standard compounds appear in channels F and A, whereas the two experimental lots appear in channel C and D. It is seen that six spots are obtained in these duplicate experiments. Spots 1, 2 and 3 are unidentified, spot 4 is Compound F, spot 5 is Compound E, and spot 6 is Compound S. As indicated, channel B and channel E are not pertinent to this example. These data indicate the 11-oxygenation of Compound S to form Compound F and Compound E. In addition, at least three other substances are produced.

EXAMPLE 6 (PM 13)

Seed medium for Neomycin (*Streptomyces fradiae* strain 3535):

| | |
|---|---|
| Crude dextrose | grams__ 10 |
| Distiller's solubles | do____ 5 |
| Potassium chloride | do____ 4 |
| Brewer's yeast | do____ 10 |
| Calcium carbonate | do____ 1 |
| Tap water | liters__ 1 |

The vegetative seed was prepared by growing the culture for three days at 24 degrees centigrade in shaker flasks.

Fermentation medium:

| | |
|---|---|
| Crude dextrose | grams__ 25 |
| Soy bean meal | do____ 25 |
| Sodium chloride | do____ 5 |
| Calcium carbonate | do____ 5 |
| Distiller's solubles | do____ 5 |
| Cobalt dichloride hexahydrate | milligrams__ 1 |
| Tap water | liters__ 1 |

This culture was allowed to grow for 24 hours on a rotary shaker at 24 degrees centigrade, whereafter a sterile ethanol solution of 111 milligrams of 11-desoxycorticosterone was added, at a concentration of 37 milligrams (in three milliliters ethanol) per 100 milliliters of beer. The culture was then grown for an additional sixteen hours, whereafter the flask contents were pooled to give 300 milliliters, and an equal volume of acetone added. Glycogen assays on the neutral hormone extract, obtained as in Example 1, indicate a recovery of 0.135 unit per milligram of substrate, which is equivalent to a 3.8 percent theoretical conversion to corticosterone (Compound B).

EXAMPLE 7 (PM 32)

In this experiment, 200 milligrams of 11-desoxycorticosterone was incubated with a Neomycin culture for seven hours in the manner of Example 1 and the neutral hormone extract obtained as in Example 1. In Figure 22, entitled "Paperchromatogram PM 32, Example 7," the data are shown for paper chromatography of a 72-gamma aliquot of the neutral hormone concentrate of this fermentation. Standard compounds are in channel B. The experimental material is in channel A. It is seen that four spots were obtained. Spot 4 is recognized as 11-desoxycorticosterone, while spots 1, 2, and 3 remains unidentified.

Figure 23:
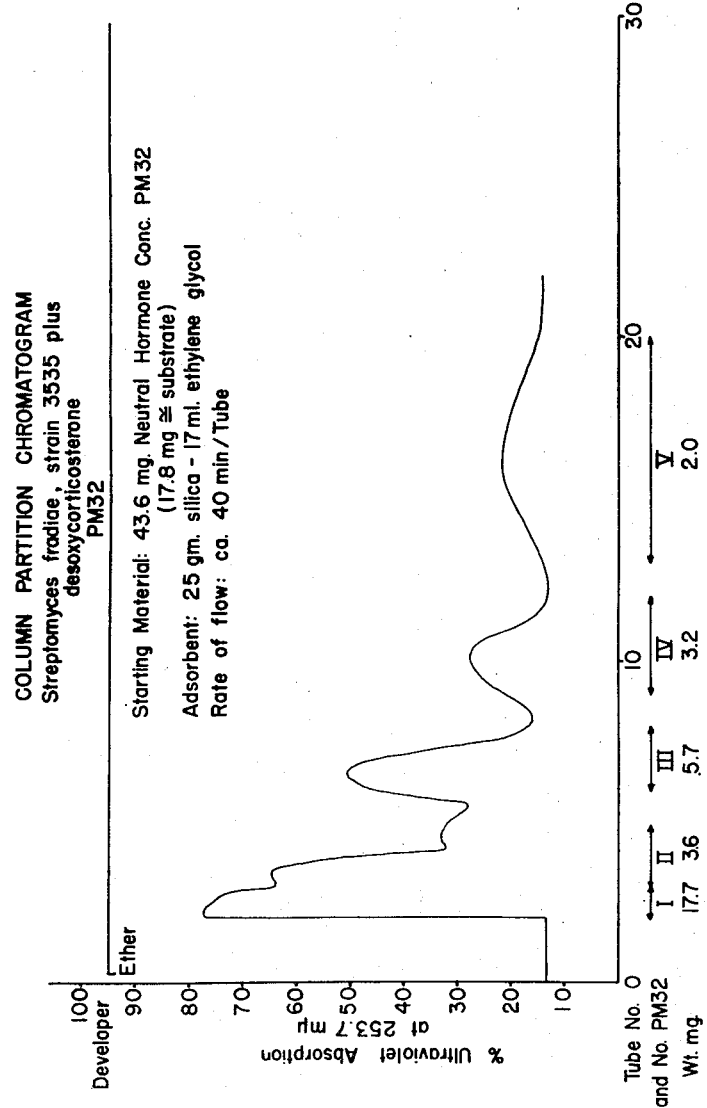
Figure 23 is a photograph of a graph of percent ultraviolet absorption against the number of tubes of effluent obtained by partition chromatography of the neutral hormone extract of Example 7. This figure is further referred to in Example 7.

An additional 43.6 milligrams of the neutral hormone concentrate were subjected to column partition chromatography. This material was transferred to filter paper discs as described previously. The adsorbent consisted of 25 grams of silica containing seventeen milliliters of ethylene glycol. The rate of flow was approximately forty minutes for sixty milliliters of effluent. The data on this chromatogram are presented in Figure 23, where the results are plotted in terms of percent ultraviolet absorption at 253.7 mu against tube numbers. Each tube represents sixty milliliters of effluent. It is seen that five bands were obtained, having the weights shown on the chart.

Band I was analyzed by infrared spectroscopy and gave no evidence of known compounds. Ultraviolet data indicated that this material did not contain an alpha-beta-unsaturated 3-ketone.

Band II was analyzed by paper chromatography as shown in Figure 24, entitled "Paperchromatogram PM 32, Example 7." The standard compounds are in channel C. A 36-gamma aliquot of Band II was chromatographed in channel A and observed to give only one unidentified spot.

Material from Band III, which weighed 5.7 milligrams was analyzed by infrared spectroscopy under the code number 169-C-MPB-3. The infrared absorption spectrum of a Nujol mull of this material is presented in Figure 25. This same compound has been isolated from the incubation of 11-desoxycorticosterone with hog adrenal tissue brei as described in the copending application of Kuizenga and Haines, Serial No. 180,508, filed August 19, 1950. A sample of this crystalline material, 192-C-MPB-3, is seen to have identical infrared absorption as shown in the previously-mentioned Figure 25. Any minor variations between the two spectra are due to the inherent variations expected in Nujol mull preparations. This substance has been given the trivial designation "MPS-1." This compound has been found to be 6-hydroxy-11-desoxycorticosterone having the empirical formula $C_{21}H_{30}O_4$ and have the following characteristic properties:

(1) Chemical analysis—

|   | I | II | III | Calculated Empirical Formula |
|---|---|---|---|---|
| C | 71.72 | 71.88 | 72.23 | I. $C_{21}H_{31.5}O_{4.2}$ |
| H | 8.98 | 9.04 | 8.89 | II. $C_{21}H_{31.5}O_{4.16}$ |
| O (by difference) | 19.30 | 19.08 | 18.12 | III. $C_{21}H_{31}O_{4.1}$ |

(2) Optical rotation, $(alpha)_D = +110$ degrees (ethanol).
(3) Melting point (Kofler block) 181–183 degrees centigrade.
(4) Infrared absorption. The following groups are present: OH, normal ketone, conjugated ketone, conjugated double bond. The relative strength of conjugated and non-conjugated ketone bands indicates a one to one ratio.
(5) Ultraviolet absorption. $k=42.5$ at 238.5 mu.
(6) Oxidation by periodic acid ($HIO_4$) to produce formaldehyde under quantitative conditions indicates this compound to have a titer equivalent to that of Compound F.
(7) Oxidation with molybdic oxide ($MoO_3$) under quantitative conditions indicates this compound to have twice the reducing capacity of Compound F.
(8) Glycogen assays indicate this compound to have less than 0.33 unit of activity per milligram.

Further evaluation of MPS-1 is presented in Figure 26, entitled "Paperchromatogram PM 32, Example 7." The standard compounds were chromatographed in channels C and D. Fifty gammas of MPS-1 were chromatographed in channel B. In channel A, a mixture of 50 gammas of MPS-1 and 40 gammas of corticosterone were chromatographed. It is seen from these data that the unknown compound, MPS-1, should be considered as slower moving than either corticosterone or Compound S. This observation may also be stated as follows: MPS-1 is more polar than Compounds B and S and less polar than Compound E.

Further analysis of the other bands from the previously mentioned column chromatogram are presented in Figure 27. Standard compounds were chromatographed in channel E. Thirty-two gammas of Band IV were chromatographed in channel D and gave rise to one unidentified spot. A mixture of 32 gammas of Band IV and twenty gammas of authentic 17-hydroxycorticosterone were chromatographed in channel C. It is seen that the two compounds were resolved into two spots, spot 1 being identified as Compound F and spot 2 remaining unidentified. This experiment indicates that the material in Band IV is not identical with 17-hydroxycorticosterone.

Twenty gammas of Band V were chromatographed in channel B, giving rise to one unidentified spot. A mixture of twenty gammas of Band V and twenty gammas of authentic 17-hydroxycorticosterone was chromatographed in channel A. The mixture was resolved into two spots. Spot 1 remains unidentified, while spot 2 was identified as Compound F by comparison with the standard. This indicates lack of identity between the material in Band V and 17-hydroxycorticosterone.

EXAMPLE 8 (PM 15)

Seed medium for Streptomyces H-39:

| | | |
|---|---|---|
| Dextrin | grams | 10 |
| Corn steep liquor | do | 80 |
| Calcium carbonate | do | 1 |
| Sodium chloride | do | 5 |
| Tap water | liters | 1 |

The medium had a pH of 6.5-6.7. The vegatative seed of this culture was grown for three days at 24 degrees centigrade in a reciprocating shaker.

*Fermentation medium.*—Same as the seed medium.

This culture was allowed to grow for 24 hours on a rotary shaker at 24 degrees centigrade, whereafter a sterile ethanol solution of 100 milligrams of 11-desoxycorticosterone was added, at a concentration of 33.3 milligrams (in three milliliters ethanol) per 100 milliliters of beer. The culture was then grown for an additional sixteen hours, whereafter the flask contents were pooled to give 300 milliliters, and an equal volume of acetone added. The neutral hormone extract was obtained in the same manner as given in Example 1.

Glycogen assay on the neutral hormone concentrate indicated the recovery of 0.075 unit per milligram of substrate, which is equivalent to a theoretical conversion to corticosterone of 2.1 percent.

EXAMPLE 9 (PM 17)

*Seed medium for Streptomyces K-93.*—Same as in Example 6.

Fermentation medium:

| | | |
|---|---|---|
| Crude dextrose | grams | 25 |
| Brewer's yeast | do | 2.5 |
| Ammonium sulfate | do | 5 |
| Calcium carbonate | do | 8 |
| Potassium chloride | do | 4 |
| Potassium acid phosphate | do | 0.4 |
| Soy bean meal | do | 7 |
| Tap water | liters | 1 |

This culture was allowed to grow for 48 hours on a rotary shaker at 24 degrees centigrade, whereafter a sterile ethanol solution of 100 milligrams of 11-desoxycorticosterone was added at a concentration of 33.3 milligrams (in three milliliters ethanol) per 100 milliliters of beer. The culture was then grown for an additional sixteen hours, whereafter the flask contents were pooled to give 300 milliliters, and an equal volume of acetone added. The neutral hormone fraction was obtained as in Example 1. Glycogen assays indicated the recovery of slightly more than 0.07 unit per milligram of substrate, which is equivalent to slightly more than a 1.9 percent theoretical conversion to corticosterone.

EXAMPLE 10 (PM 18)

*Seed medium for Streptomyces endus.*—Same as in Example 9.

*Fermentation medium.*—Same as in Example 9.

One hundred milligrams of 11-desoxycorticosterone were incubated with *Streptomyces endus* (9-20) for sixteen hours, and the neutral hormone extract obtained as in Example 1. Slightly more than 0.075 glycogen unit per milligram of substrate were obtained, which is equivalent to slightly more than a 2.1 percent theoretical conversion to Compound B (corticosterone).

EXAMPLE 11 (PM 19)

*Seed medium for Streptomyces W-4.*—Same as in Example 9.

*Fermentation medium.*—Same as in Example 9.

One hundred milligrams of 11-desoxycorticosterone were incubated with Streptomyces (W-4) for sixteen hours and the neutral hormone extract obtained as in Example 1. Glycogen assay indicated a recovery of slightly less than 0.065 unit per milligram of substrate, which is equivalent to a theoretical conversion to corticosterone of slightly less than 1.8 percent.

EXAMPLE 12 (PM 21)

Seed medium for Streptomyces BC 17

| | | |
|---|---|---|
| Dextrin | grams | 20 |
| Ammonium sulfate | do | 10 |
| Calcium carbonate | do | 16 |
| Brewer's yeast | do | 20 |
| Potassium chloride | do | 4 |
| Potassium acid phosphate | do | 0.2 |
| Tap water | liters | 1 |

The vegetative seed was prepared by growing the culture for three days at 24 degrees centigrade in shaker flasks.

Fermentation medium

| | | |
|---|---|---|
| Crude dextrose | grams | 25 |
| Brewer's yeast | do | 5 |
| Ammonium sulfate | do | 5 |
| Calcium carbonate | do | 8 |
| Sodium chloride | do | 4 |
| Potassium acid phosphate | do | 0.4 |
| Soy bean meal | do | 7 |
| Tap water | liters | 1 |
| Cobalt dichloride hexahydrate | milligrams | 1 |

This culture was allowed to grow for 72 hours on a rotary shaker at 24 degrees centigrade, whereafter a sterile ethanol solution of 100 milligrams of 11-desoxycorticosterone was added, at a concentration of 33.3 milligrams (in three milliliters ethanol) per 100 milliliters of beer. The culture was then grown for an additional sixteen hours, whereafter the flask contents were pooled to give 300 milliliters and an equal volume of acetone added. A neutral hormone extract was obtained as in Example 1.

Glycogen assay indicated a recovery of 0.06 unit per milligram of substrate, which is equivalent to a theoretical conversion of 1.6 percent to corticosterone.

EXAMPLE 13 (PM 8)

Vegetative seed medium for *Saccharomyces pastorianus* (ATCC 2366)

| | | |
|---|---|---|
| Cerelose (crude dextrose) | grams | 10 |
| Curbay BG-40 (distiller's solubles) | do | 5 |
| Potassium chloride | do | 4 |
| Brewer's yeast 2019 | do | 10 |
| Calcium carbonate | do | 1 |
| Tap water | liters | 1 |

Fermentation medium

| | | |
|---|---|---|
| Crude dextrose | grams | 20 |
| Brewer's yeast | do | 20 |
| Ammonium sulfate | do | 10 |
| Potassium chloride | do | 4 |
| Calcium carbonate | do | 16 |
| Potassium acid phosphate | do | 0.2 |
| Tap water | liters | 1 |

This medium was sterilized for thirty minutes under pressure of fifteen pounds.

The vegetative seed of the culture was prepared by growing the culture for three days at 24 degrees centigrade in shaker flasks. At the time of seeding the fermentation medium, at a rate of five milliliters of vegetative growth per 100 milliliters of fermentation medium, a sterile ethanol solution of 100 milligrams of 11-desoxycorticosterone was added at a concentration of 33.3 milligrams (in three milliliters of ethanol) per 100 milliliters of beer. The culture was then grown at 24 degrees centigrade in shaker flasks on a reciprocating shaker for ninety hours, whereafter the flask contents were pooled to give 300 milliliters and an equal volume of acetone added. A neutral hormone fraction was obtained in the manner of Example 1.

Glycogen assays on the neutral hormone fraction indicated a recovery of 0.065 unit per milligram of substrate, which is equivalent to a theoretical conversion to corticosterone of 1.8 percent.

EXAMPLE 14 (PM 12)

*Aspergillus fumigatus H-3*

The seed medium was the same as that used in Example 13. In this case the seed was grown for two days at 24 degrees centigrade in shaker flasks.

Fermentation medium:
  Crude dextrose _____grams__ 25
  Brewer's yeast _____do____ 2.5
  Ammonium sulfate _____do____ 5
  Calcium carbonate _____do____ 8
  Sodium chloride _____do____ 4
  Potassium acid phosphate_____do____ 0.4
  Soy bean meal_____do____ 7
  Tap water _____liters__ 1

A sterile ethanol solution of 100 milligrams of 11-desoxycorticosterone was added at a concentration of 33.3 milligrams (in three milliliters ethanol) to the above fermentation medium. The culture was then grown on a reciprocating shaker for 114 hours, after which the flask contents were pooled to give 300 milliliters and an equal volume of acetone added. Glycogen assay on the neutral hormone concentrate, obtained as in Example 1, indicated a recovery of 0.05 unit per milligram of substrate, which is equivalent to a theoretical conversion to corticosterone of 1.4 percent.

EXAMPLE 15 (PM 35)

*Penicillium chrysogenum, Wisconsin strain 48–701*

Seed medium:
  Lactose _____grams__ 20
  Dextrose _____do____ 5
  Distiller's solubles _____do____ 20
  Urea _____do____ 1
  Potassium acid phosphate_____do____ 0.5
  Magnesium sulfate _____do____ 0.25
  Tap water _____liters__ 1

The vegetative seed was prepared by growing the culture for three days at 24 degrees centigrade in shaker flasks.

Fermentation medium:
  Lactose _____grams__ 30
  Corn steep liquor_____do____ 40
  Calcium carbonate _____do____ 10
  Lard oil _____milliliters__ 10
  Tap water _____liters__ 1

The culture was allowed to grow for forty hours on a rotary shaker at 24 degrees centigrade, after which a sterile ethanol solution of 100 milligrams of 11-desoxycorticosterone was added at a concentration of 33.3 milligrams (in three milliliters ethanol) per 100 milliliters of beer. The culture was then grown for an additional seven hours, whereafter the flask contents were pooled to give 300 milliliters, and an equal volume of acetone added. Glycogen assay on the neutral hormone concentrate obtained as in Example 1, indicated a recovery of 0.075 unit per milligram of substrate, which is equivalent to a theoretical conversion to corticosterone of 2.1 percent. Further evaluation of the neutral hormone concentrate is presented in Figure 28, entitled "Paperchromatogram PM 35, Example 15." The standard compounds were chromatographed in channel C. Seventy-five gammas from the fermentation beer were chromatographed in channel A, giving rise to one unidentified spot.

EXAMPLE 16 (PM 31)

The medium used for seed preparation had the following composition:

Dextrin _____grams__ 20
  Ammonium sulfate _____do____ 10
  Calcium carbonate _____do____ 16
  Brewer's yeast _____do____ 20
  Potassium chloride _____do____ 4
  Potassium acid phosphate_____do____ 0.2
  Tap water _____liters__ 1

The pH was adjusted to 7.5 with potassium hydroxide.

One hundred milliliters of medium was sterilized in 500-milliliter flasks at fifteen pounds steam pressure for thirty minutes and, after cooling, was inoculated from an agar slant culture of *Streptomyces sp.* BC–17. After flask of medium was inoculated, it was shaken on a reciprocating shaker for three days. The incubation temperature was 24 degrees centigrade. Five milliliters of the resulting heavy vegetative growth were used to seed each of three flasks containing 100 milliliters of the following medium:

Crude dextrose _____grams__ 25
  Brewer's yeast _____do____ 5
  Ammonium sulfate _____do____ 5
  Calcium carbonate _____do____ 8
  Sodium chloride _____do____ 4
  Soy bean meal_____do____ 7
  Potassium acid phosphate_____do____ 0.4
  Tap water _____liters__ 1

The three flasks were shaken on a rotary shaker in a 24 degrees centigrade incubator room for 41 hours. At this stage of the fermentation, 33.3 milligrams of 11-desoxycorticosterone in three milliliters of alcohol was added to each flask, or a total of 100 milligrams to three flasks. The ethanol solution of 11-desoxycorticosterone was sterilized by filtration through an ultrafine glass filter. The flasks were shaken an additional seven hours after the steroid addition and were then removed. The contents of the flasks were pooled to afford 300 milliliters of beer to which 300 milliliters of acetone were added. The mixture was stored in a cold room and extracted in the manner of Example 1.

The neutral hormone concentrate was evaluated by glycogen assay, showing positive results. An apparent toxicity was detected, which ordinarily causes the activity to be lower than the actual amount. Further evaluation of this neutral hormone concentrate is presented in Figure 29, entitled "Paperchromatogram PM 31, Example 16." The standard compounds were chromatographed in channel F. Only channel A of the remaining channels is pertinent to this example. A 99-gamma aliquot of this fraction were chromatographed in channel A, giving rise to five spots. Spots 1, 2 and 3 are unidentified by this paperchromatogram. However, even though standards were not available, it is highly probable that spot 2 is in the Compound F region and that spot 3 is in the Compound E region. Spot 4 is identified as corticosterone and spot 5 is identified as 11-desoxycorticosterone.

EXAMPLE 17 (PM 38)

The following medium was used to prepare vegetative seed:

Dextrin _____ grams__ 10
Corn steep liquor _____ do____ 80
Sodium chloride _____ do____ 5
Calcium carbonate _____ do____ 1
Tap water _____ liters__ 1 pH was adjusted to 6.7 with potassium hydroxide. One hundred milliliters of medium in an Erlenmeyer flask was sterilized at fifteen pounds steam pressure for thirty minutes and, after cooling, was seeded from an agar slant of *Aspergillus fumigatus* strain H-3. The flask was placed on a reciprocating shaker in a 24 degrees centigrade incubator for three days.

Five milliliters of the resulting heavy growth were used to inoculate each of six flasks containing 100 milliliters of the dextrin-corn steep medium of the same composition used for the seed production described above. After inoculation, the flasks were placed on a rotary shaker. A heavy growth of the culture was observed 41 hours after seeding of the medium, and at this time 33.3 milligrams of 11-desoxycorticosterone in three milliliters of ethanol was added to each of the flasks, for a total of 200 milligrams to the six flasks. The ethanol solution of 11-desoxycorticosterone was sterilized by filtration through an ultrafine sintered glass filter. After an additional seven hours, the flasks were removed from the shaker, the contents (600 milliliters) pooled, and an equal volume of acetone added. The mixture was stored in a cold room, and extracted in the manner of Example 1.

Evaluation of the neutral hormone fraction by paper chromatography is shown in Figure 30, entitled "Paperchromatogram PM 38, Example 17." The standard compounds were chromatographed in channel B. A twenty-gamma aliquot of the neutral hormone concentrate from this experiment was chromatographed in channel A. After four hours, there was evidence for five spots in channel A. Spots 1, 2, and 3 remain unidentified spot 4, which is a very small spot, is in the corticosterone region, and spot 5 appears to be 11-desoxycorticosterone. The results of a longer term chromatogram are presented in Figure 31, entitled "Paperchromatogram PM 38, Example 17." The standard compounds were separated in channel C. A twenty-gamma aliquot of the fermentation concentrate was chromatographed in channel A. Evidence for four spots was obtained. None of these spots appears to match the positions of the standard compounds.

Other microorganisms besides bacteria of the genus Streptomyces, which have been found useful in the oxygenation of steroids, including eleven desoxy steroids, although not necessarily producing the same result as the bacteria of the Streptomyces genus, include various strains of Penicillium, e. g., chrysogenum, Wisconsin strain 48–701; Aspergilli, e. g., *Aspergillus fumigatus* H–3, and Saccharomyces, e. g., *Saccharomyces pastorianus,* and like species of the mentioned genera, as will be apparent from the preceding examples.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of 17-hydroxycorticosterone comprising the steps of aerobically growing a culture of an oxygenating strain of a bacterium of the Streptomyces genus in an aqueous nutrient medium, and exposing 11- desoxy-17-hydroxycorticosterone to the oxygenating action of enzymes produced by the said culture.

2. A process for the production of corticosterone comprising the steps of aerobically growing a culture of an oxygenating strain of a bacterium of the genus Streptomyces in a nutrient medium therefor, and exposing 11-desoxycorticosterone to the oxygenating action of the said culture.

3. A process for the production of an eleven oxygenated steroid comprising the aerobic agitated fermentation of a nutrient-containing substrate, containing a steroid having an eleven methylene group, by means of a submerged growth of an oxygenating strain of a bacterium of the genus Streptomyces, in the presence within the medium of an oxygen-containing gas.

4. A process for the production of an oxygenated steroid comprising the steps of contacting a steroid with aerobically growing microorganisms of the genus Streptomyces in an agitated, aqueous nutrient medium containing assimilable nitrogen and extracting the thus-produced oxygenated steroid.

5. A process for the production of an oxygenated steroid comprising the steps of contacting a steroid having an eleven methylene group with aerobically growing microorganisms of the genus Streptomyces in an agitated, aqueous carbohydrate-containing nutrient medium.

6. A process for the production of an oxygenated steroid comprising the steps of contacting a steroid with aerobically growing microorganisms of the genus Streptomyces in an aqueous nutrient medium therefor, and separating the thus-produced oxygenated steroid.

7. A process for the production of an oxygenated steroid comprising the steps of contacting a steroid with aerobically growing microorganisms of the genus Streptomyces in an aqueous nutrient medium therefor and extracting the thus-produced oxygenated steroid.

8. A process comprising contacting 11-desoxycorticosterone with aerobically growing microorganisms of the genus Streptomyces in an aqueous nutrient carbohydrate-containing medium.

9. A process comprising contacting 11-desoxy-17-hydroxycorticosterone with aerobically growing microorganisms of the genus Streptomyces in an aqueous nutrient carbohydrate-containing medium.

10. A process comprising contacting progesterone with aerobically growing microorganisms of the genus Streptomyces in an aqueous nutrient carbohydrate-containing medium.

11. A process comprising aerobically growing a culture of microorganisms of the genus Strepomyces in a nutrient medium therefor and aerobically exposing progesterone to the oxygenating action of the said culture.

12. A process comprising contacting 11-desoxycorticosterone with aerobically growing bacterium of the species *Streptomyces fradiae*, in an aqueous nutrient medium.

13. A process comprising contacting 11-desoxy-17-hydroxycorticosterone with aerobically growing bacterium of the species *Streptomyces fradiae*, in an aqueous nutrient medium.

14. A process comprising contacting progesterone with aerobically growing bacterium of the species *Strepomyces fradiae*, in an aqueous nutrient medium.

15. A process comprising contacting 11-desoxycorticosterone with aerobically growing bacterium of the species *Streptomyces endus*, in an aqueous nutrient medium.

16. A process comprising contacting 11-desoxy-17-hydroxycorticosterone with aerobically growing bacterium of the species *Streptomyces endus*, in an aqueous nutrient medium.

17. A process comprising contacting progesterone with aerobically growing microorganisms of the genus Streptomyces in an agitated, aqueous nutrient medium therefor.

18. A process comprising contacting progesterone with aerobically growing bacterium of the species *Streptomyces fradiae* in an agitated, aqueous nutrient carbohydrate-containing medium.

19. A process for the production of an oxygenated steroid comprising the steps of aerobically growing a culture of an oxygenating strain of an organism of the Streptomyces genus, and exposing a steroid to the oxygenating activity of enzymes produced by the said culture.

20. A process for the production of an eleven oxygenated steroid comprising the aerobic fermentation of a nutrient-containing substrate, containing a steroid having an eleven methylene group, by means of a submerged growth of an organism of the genus Streptomyces.

WILLIAM J. HAINES.
DONALD R. COLINGSWORTH.

References Cited in the file of this patent

UNITED STATES PATENTS

| Number | Name | Date |
|---|---|---|
| 2,142,170 | Bockmuhl | Jan. 3, 1939 |
| 2,461,563 | Miescher et al. | Feb. 15, 1949 |
| 2,493,489 | Langlykke et al. | Jan. 3, 1950 |
| 2,602,769 | Murray et al. | July 8, 1952 |

FOREIGN PATENTS

| Number | Country | Date |
|---|---|---|
| 235,279 | Switzerland | of 1945 |

OTHER REFERENCES

Waksman, The Actinomycetes, pages 23, 28, 29, Chronica Botanico Co., Waltham, Mass., 1950.

Hechter et al., J. Am. Chem. Soc., September 1949, vol. 71, pages 3261-2.

Welsch et al., Compt. Rend. Soc. Biol., vol. 142, 1948, pages 1074-6, cited in 1949 Chem. Abstracts 4331.

Heusghem et al., Bull Soc. Chem. Biol., 31, 282-6 (1949), cited in 1949 Chem. Abstracts 9147.